United States Patent [19]

Ecker

[11] Patent Number: 5,051,029
[45] Date of Patent: Sep. 24, 1991

[54] MARINE SPILL CONTAINMENT METHOD AND APPARATUS

[76] Inventor: Clifford G. Ecker, 7837 Wooddale Way, Citrus Heights, Calif. 95610

[21] Appl. No.: 563,314

[22] Filed: Aug. 6, 1990

[51] Int. Cl.$^5$ ............................................. E02B 15/06
[52] U.S. Cl. ........................................ 405/68; 405/66
[58] Field of Search ...................... 405/60, 63, 65, 66, 405/67, 68, 69, 72; 210/923

[56] References Cited

U.S. PATENT DOCUMENTS

| | | |
|---|---|---|
| 2,682,151 | 6/1954 | Simpson et al. |
| 3,599,434 | 8/1971 | Missud ................ 405/68 X |
| 3,818,708 | 6/1974 | Benson . |
| 4,000,532 | 1/1977 | Nielsen . |
| 4,015,431 | 4/1977 | Ahiko . |
| 4,215,644 | 8/1980 | Jackson ............. 405/66 X |
| 4,249,834 | 2/1981 | Bouvier . |
| 4,449,850 | 5/1984 | Cessou et al. ........... 405/60 |
| 4,960,347 | 10/1990 | Strange ................ 405/63 |

FOREIGN PATENT DOCUMENTS 01580 8/1980 PCT Int'l Appl. ............... 405/66

*Primary Examiner*—David H. Corbin

[57] ABSTRACT

Material containment apparatus and method for effectively containing spilt material floating in water around a structure such as an oil transport ship. Primary components include a protective openable storage housing attached to and encircling the ship above the water line, inflatable and multi-directionally expandable buoyant containment boom, a vertically extendable oil impervious curtain which hangs below the boom in the water, boom inflating and positioning arms to maintain a separation between the deployed floating boom and the ship, a vapor capturing curtain between the deployed boom and the ship above the spilt material, and a vent or burn-off stack to dispose of hazardous fumes which are captured under the vapor curtain from evaporating spilt materials such as oil. The boom, boom positioning arms, and curtains are stored in the storage housing as a complete structure ready for instant deployment. The invention includes controls and powered actuators allowing deployment of the equipment, once initially installed on a ship, around a spill by a single person within a matter of minutes. The invention also includes back-up structuring associated with most of the various primary components of the invention to render containment of a spill virtually fail-safe.

5 Claims, 17 Drawing Sheets

MARINE SPILL CONTAINMENT METHOD AND APPARATUS

BACKGROUND OF THE INVENTION

1. Field of the Invention

This invention relates to equipment, methods and systems for containing spilt cargo and material floating in water. The invention is particulary directed toward spill containment equipment attachable to a ship or off-shore derrick, and quickly deployable therefrom by a single person to confine spilt materials such as oil and the like to a close proximity to the structure from which the material spilt.

2. Background of the Invention

A variety of past art patents disclose information pertaining to the containment of spilt cargo and material floating in water around ships or off-shore derricks, particulary spilt oil. Additional information to that herein disclosed pertaining to the containment of spilt materials around ships or derricks may be found in U.S. Pat. Nos. 4,249,834, 2,682,151, 4,015,431, 3,818,708 and 4,000,532. No such apparatuses, systems, or methods are seen to be as efficient at containing split material, and which are at the same time as rapidly deployable as the marine spill containment apparatus and method of this disclosure.

SUMMARY OF THE INVENTION

The invention of this disclosure is provided to effectively contain spilled material floating in water around a ship or off-shore derrick. The primary containment structures included as part of the invention are desirably coupled with redundant back-up structuring therefore, to assure that a failure in any portion of the structuring will not result in a catastrophic failure of the containment of the spill. The invention as a whole is intended to make the complete containment of a spill virtually fail-safe, and within a couple of minutes from the commencement of the spill.

A portion of my containment apparatus is storable around a ship or off-shore derrick in a protective openable storage housing of the invention. The permanently attached impact resistant storage housing is generally weather tight. The storage housing protects the equipment stored therein from accidental and damaging impact. The storage housing also protects the stored equipment from the long term damaging effects of exposure to ultraviolet light of the sun and moist salt-air, elements which are known to rapidly break-down certain materials such as thin, flexible fabrics and plastics commonly used in spill containment equipment. Without a protective housing, the long term cost of use of my invention would dramatically increase due to having to periodically replace some of the older and needlessly decayed components thereof.

With the increased awareness of the fragility of our environment today, the speed at which a spill may be contained around a ship or derrick is seen to be critical. As a part of the invention, a continuous length of flexible buoyant boom and attached containment curtain is stored deployable-ready in the protective storage housing encircling the derrick or ship. The boom and curtain, once deployed will generally envelope and contain the spill in a matter of minutes to prevent the loss of even small quantities of the spilt material. Through the use of solenoid control valves, linear extendable actuators, and control circuitry therefore, my containment apparatus is structured to be rapidly and fully deployable by the actions of a single person, once the invention has been initially installed on a ship or derrick.

The degree of containment of spilt material floating around a structure is also seen to be quite critical. Nobody wants even small quantities of oil or other contaminates to wash-up on their beaches or to poison their marine life. My spill containment apparatus is specifically structured to provide adequate containment or storage space around a ship to contain all of the cargo carried by a vessel which may spill. In other words, the size of the containment area is desirably calculated relative to the cargo carrying capacity of the ship, and is preferably sized to contain at least 150 percent of the cargo capacity of the ship for an added safety margin. My spill containment apparatus is also structured and sized to contain a large quantity of spilt material (oil) around an off-shore derrick, giving workmen what is hopefully sufficient time to cap the leak before the containment barrier is full to capacity, or to provide sufficient time for a tanker ship to arrive and begin recovering the floating oil from within the containment barrier.

The spill containment invention of this disclosure, although particulary concerned with containing spilt oil floating on water, is also capable of both containing and venting or burning-off hazardous fumes arising from the contained oil in order to reduce the risks of uncontrolled fire and explosion. The invention is also useful for containing materials other than oil, including agricultural products such as spilt grain floating around the exterior of a ship.

It should be noted, the equipment and methods of this disclosure may be applied to a ship having a single hull, or a double hull. When applied to a double hull ship, the invention adds an extra measure of protection against spills should the double hull be ruptured, which may easily happen, since the normal separation between the first and second hull of a double hull vessel is about six feet, and hull ruptures by unseen rocks and other obstacles in the water often punch inward into the ship far more than six feet.

Therefore a primary object of the invention is to provide an apparatus and method useful in confining spilt material floating in water to an area of close proximity to the ship, derrick, or other structure from which the material was spilt.

Another object of the invention is to provide the above in an apparatus which is very quickly deployable completely around the spilt or spilling material by a single person once the invention has been initially installed on a structure.

Another object of the invention is to provide the above in an apparatus which incorporates secondary or back-up structuring for most of the primary containment and deployment structures to render the containment of a spill generally fail-safe.

Another object of the invention is to provide the above in an apparatus which includes structuring for containing and disposing of vapors which may be given-off by the spilled yet contained material.

Another object of the invention is to provide the above in an apparatus which is attachable to a ship or derrick by way of either refitting an existing ship or derrick, or in the initial building stage of the ship or derrick.

Another object of the invention is to provide the above in an apparatus which is suitable for continuous, long-term protected attachment to the ship or derrick, always being ready for rapid deployment at any given instant should a spill occur.

Another object of the invention is to provide the above in an apparatus which may be sized to contain the entire cargo should it all spill from a ship, and sized to contain large quantities of spilt material around a derrick to give workmen time to cap the leak.

Another object of the invention is to provide the above in an apparatus which is relatively inexpensive to use over a long period of time.

A still further object of the invention is to provide the above in an apparatus which will function to contain a spill around a ship which has either partially sunk, or completely sunk, providing the ship sank in about 70 meters of water or less.

The appreciation of additional objects and advantages of my marine spill containment apparatus and method, and further information to allow both the building and use of my invention will be gained by those skilled in the art with a continued reading of the specification and claims, coupled with examination of the appended drawings.

BRIEF DESCRIPTION OF THE DRAWINGS

FIG. 6 B is a perspective partial top view of one of the many weighted straps utilized around the boom and curtain.

FIG. 12 B is an end view of the air flow restrictor showing the wind impeller thereof within the housing.

BEST MODE FOR CARRYING OUT THE INVENTION

Figure 1:
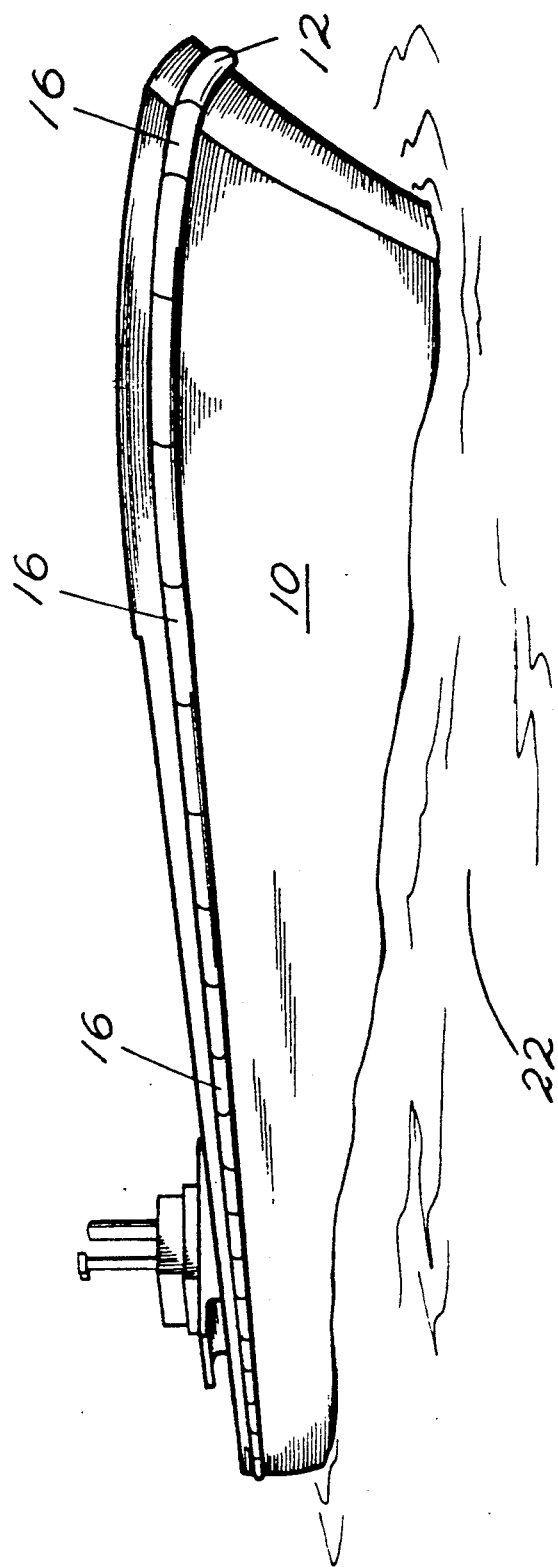
FIG. 1 is a view of an oil tanker with the marine spill containment apparatus of this disclosure in a stored state, ready for instant deployment. The deployable equipment is stored in the protective openable storage housing encircling the hull of the ship above the water line.
Figure 21:
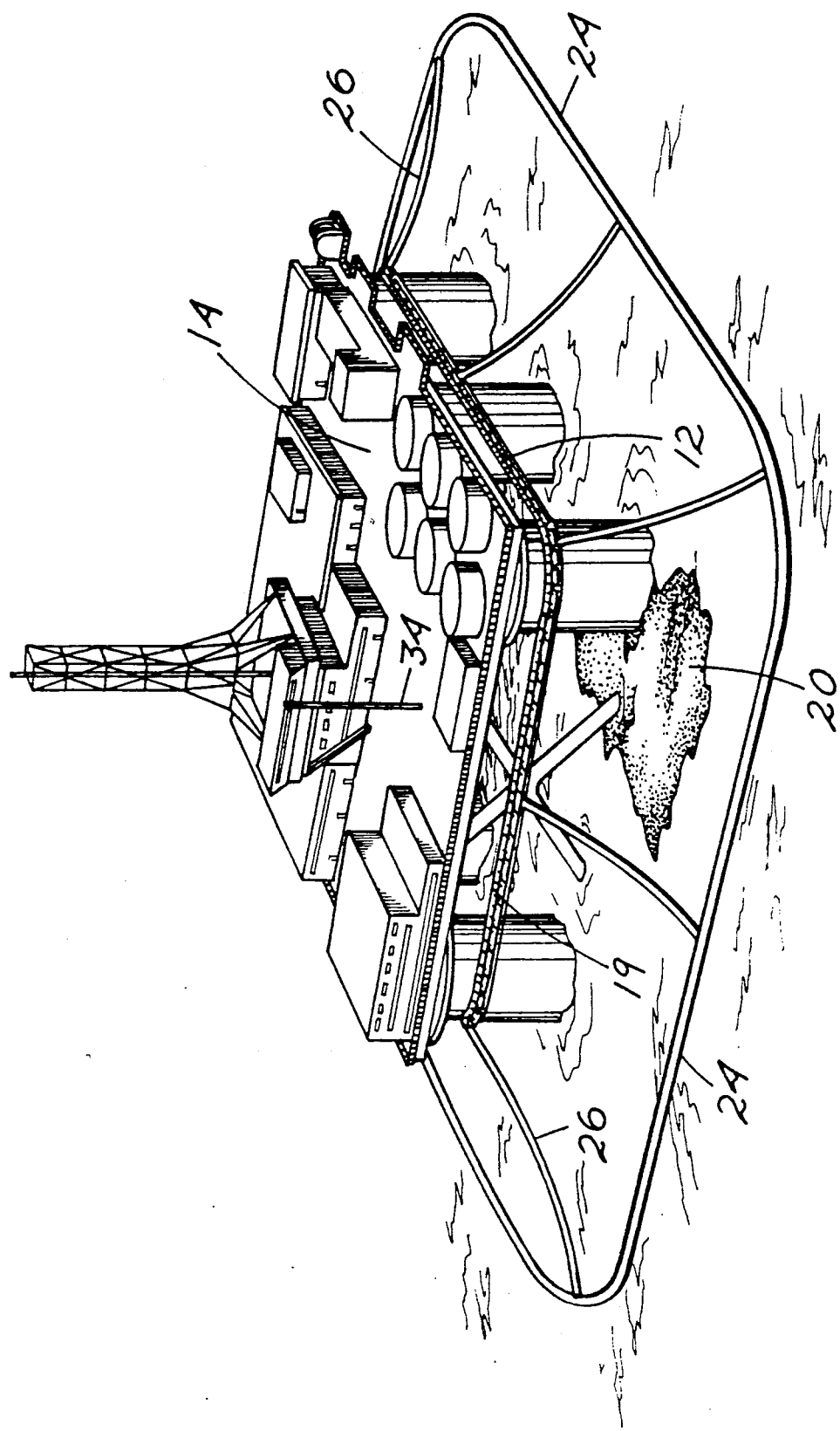
FIG. 21 illustrates the spill containment apparatus of this disclosure affixed to, and deployed outward around an oil derrick to contain an oil spill.

The following will first be a brief overview of the method and apparatus of the invention to enhance the reader's understanding of the more detailed descriptions which will follow this brief overview. Referring now to the drawings in general where in FIG. 1 an oil tanker 10 has been equipped in advance with the marine spill containment apparatus of this disclosure in anticipation of possibly having a ruptured hull in the future. The attachment of the marine spill containment apparatus may have been accomplished when ship 10 was built, or afterwards in a refitting operation. The deployable apparatus, which is comprised of the spill containment apparatus 8 which is deployable toward or into the water, is in a long term stored condition, ready for rapid deployment from a protective openable housing 12 encircling the hull of ship 10 above the water line. FIG. 21 illustrates my spill containment apparatus affixed to, and currently outwardly deployed around an oil derrick 14 to contain an oil spill. My invention is equally applicable to either an oil tanker or ship 10, and a derrick 14 as far as installation and use of the invention is concerned, and therefore the two structures, ship 10 and derrick 14, may be generally referred to as structure 15 further in this disclosure.

Figure 2:
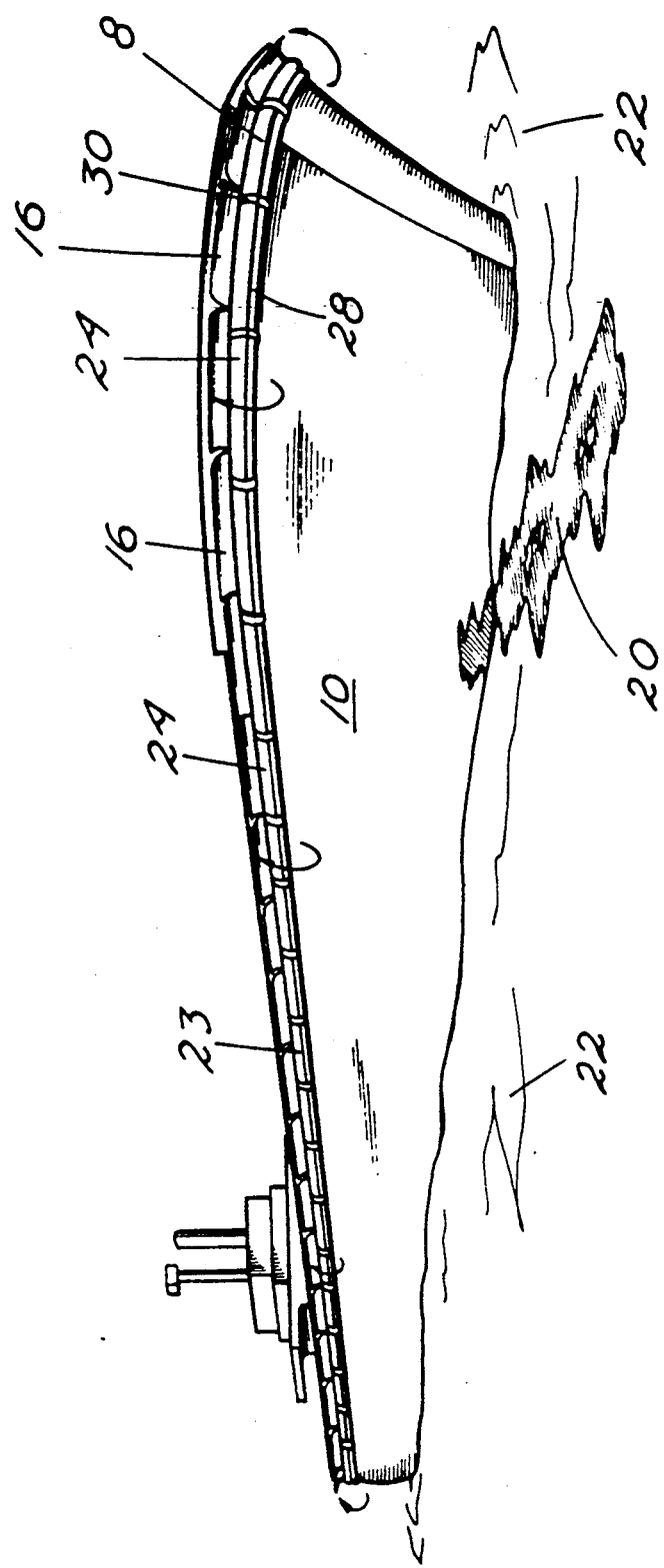
FIG. 2 is a view of the ship of FIG. 1 with a ruptured hull and spilling oil therefrom. The storage housing is in the process of being opened to deploy spill containment apparatus therefrom.

In FIG. 2, ship 10 is shown with a ruptured hull and spilling oil 20 therefrom into water 22 surrounding the ship. At this point in time, a crew member of the ship has already and very recently activated the deployment system upon discovery of the leak. The deployment system is automatic from the point of manual activation. The controls and equipment enabling deployment by a single person will be more specifically detailed later.

Also shown in FIG. 2 is storage housing 12 in the process of being rapidly opened to deploy the continuous open-centered loop of oil impervious inflatable boom 24 and oil impervious curtain 28 which have been previously stored encircling the exterior circumference of ship 10 in housing 12. Both boom 24 and curtain 28 are stored in housing 12, folded using accordion-like folds into a small circumferential loop 23, with the accordion-like folds allowing an unfolded and greatly expanded large circumferential loop 25 of boom 24 and curtain 28 when deployed in the water. Accessory vapor barrier 32, and boom support arms 26 which will be explained later, also folds accordion-like along with boom 24 and curtain 28 for compact storage in housing 12.

Figure 3:
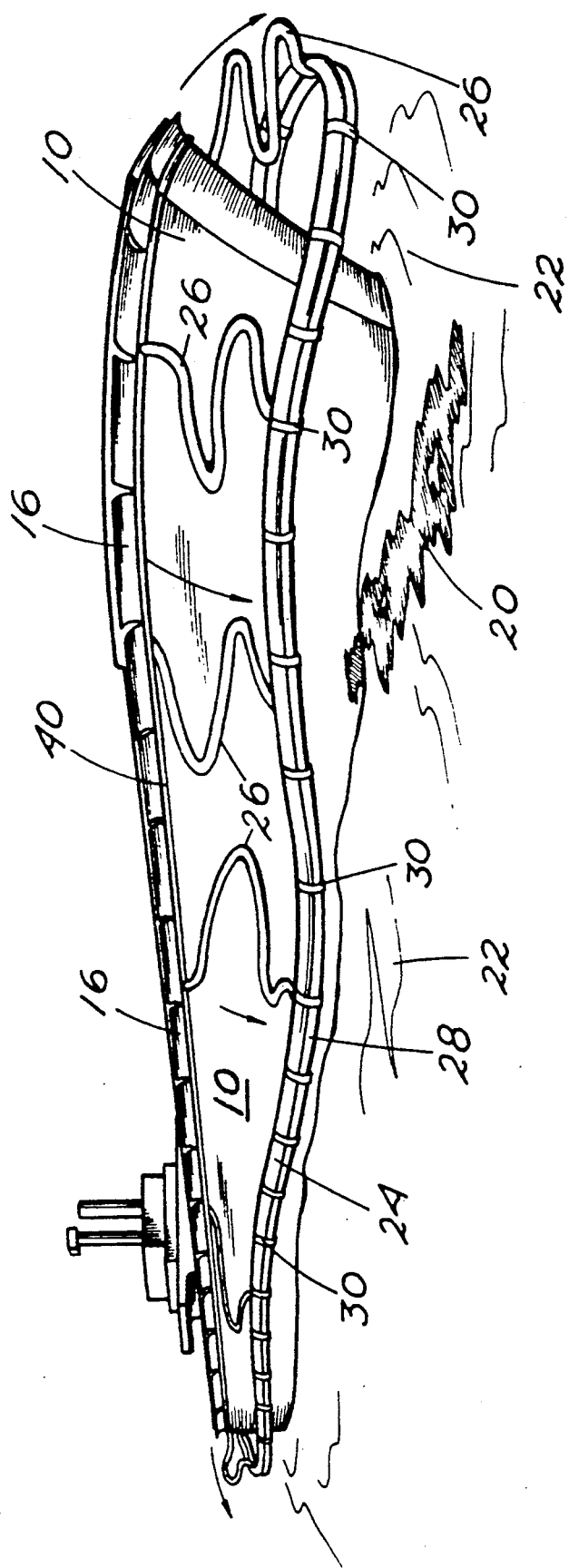
FIG. 3 is a view of the ship of FIG. 2 with some of the spill containment apparatus in the initial deployment process of dropping into the water. A continuous open-centered loop of inflatable boom is shown partially inflated, and a plurality of inflatable boom support arms are shown pushing the boom outward away from the hull.

In FIG. 3, ship 10 is shown with spill containment apparatus having progressed further through the initial deployment process of dropping to water 22 under the pull of gravity and the push of the inflating boom support arms 26. The continuous open-centered loop of inflatable boom 24 is shown partially inflated and expanded to a larger circumferential loop 25. A plurality of inflatable boom support arms 26 are shown pushing boom 24 downward and outward away from ship 10, and beyond the still relatively small oil slick. Boom support arms 26 become stiff with inflation, and are also the conduits which feed air into boom 24 for inflation thereof to its major diameter.

Figure 4:
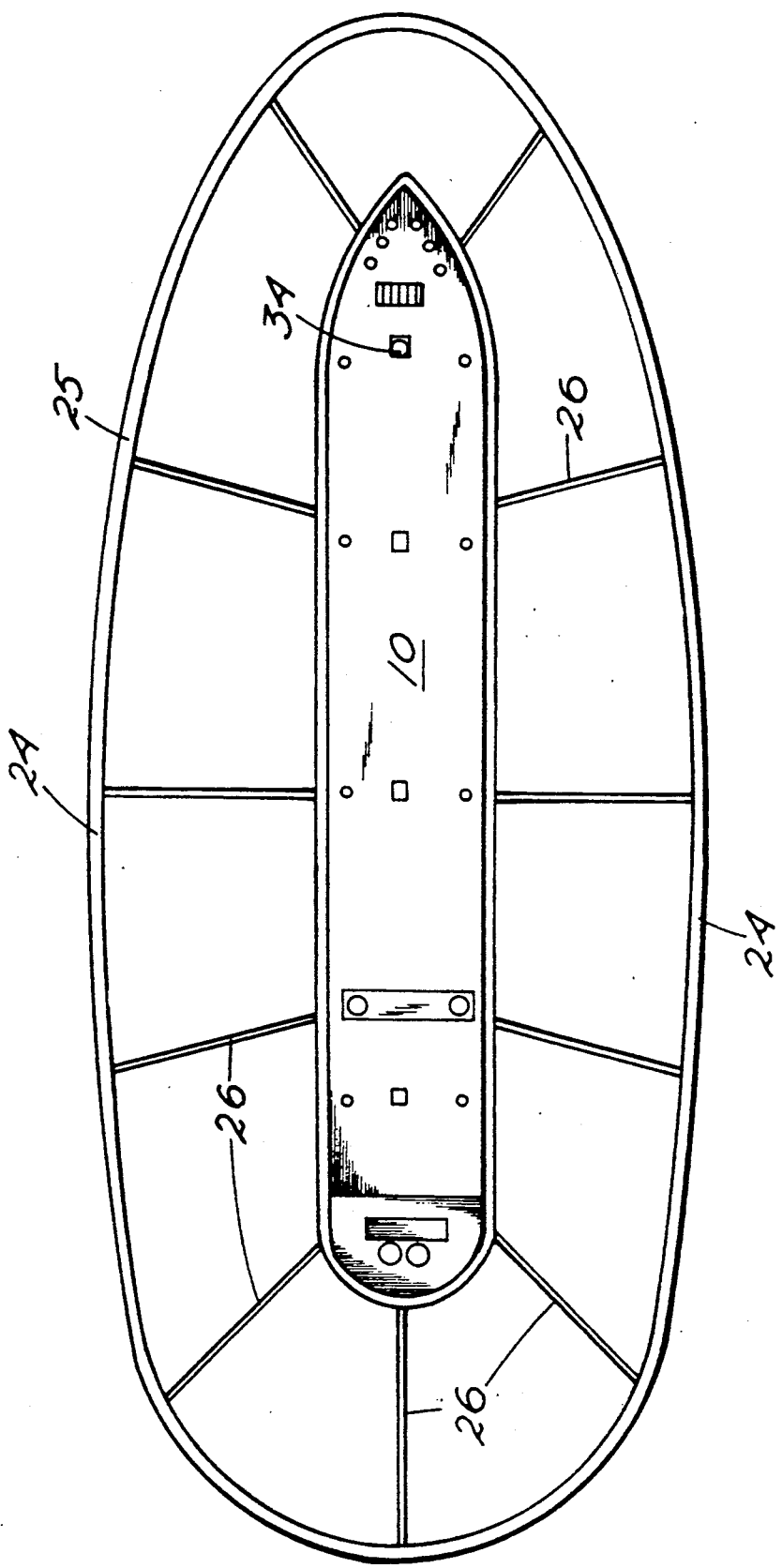
FIG. 4 is a top view of the ship of FIG. 3 with the spill containment apparatus having progressed further through the initial deployment process. The now floating and fully expanded boom is shown encircling the ship, and held away from the hull of the ship by the plurality of stiffened boom support arms.
Figure 5:
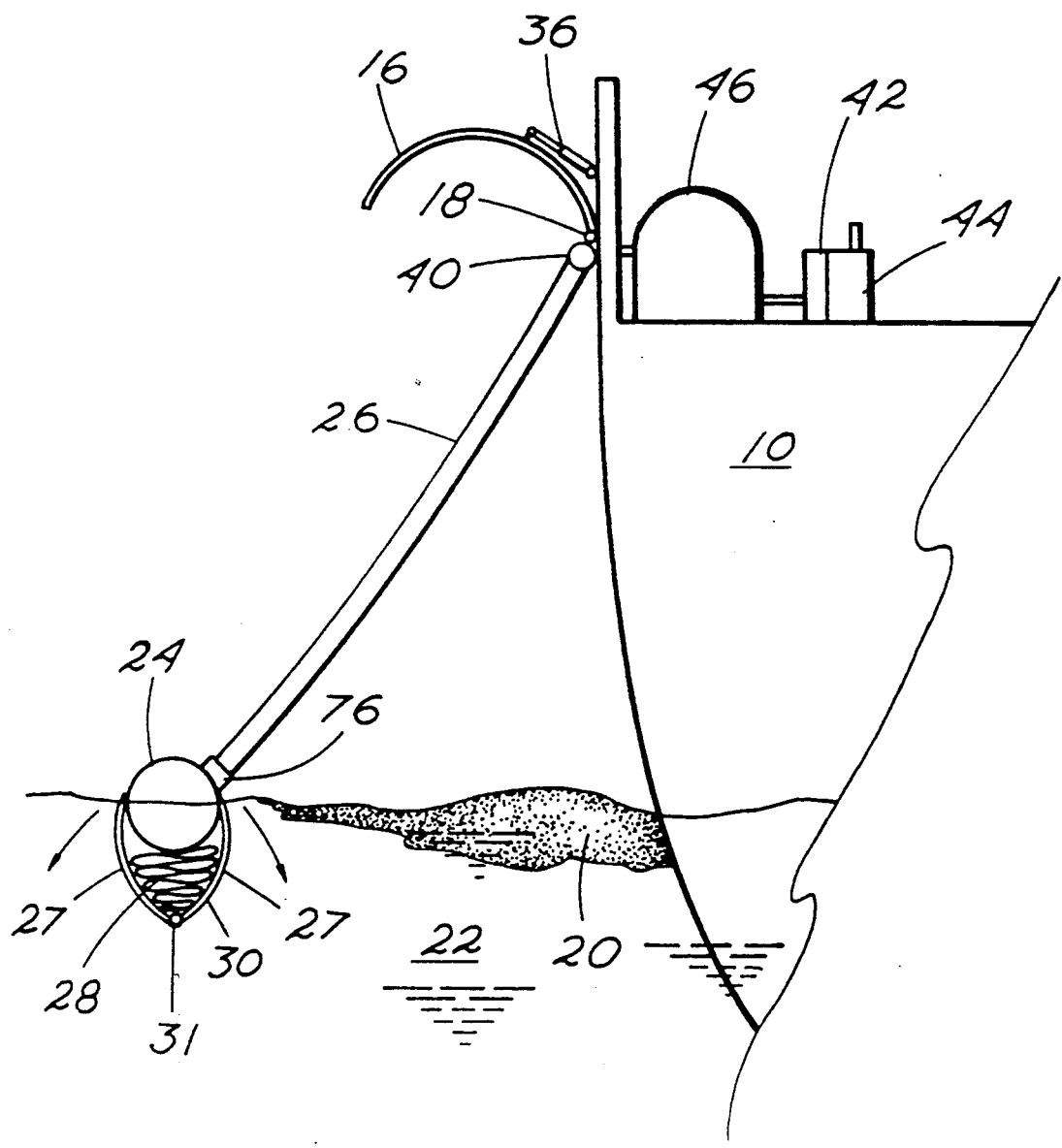
FIG. 5 is a view illustrative of the boom support arms maintaining the floating boom away from the ship hull. The boom is shown having an folded, oil impervious curtain attached on the underside thereof. The curtain is shown retained against the underside of the boom by a weighted strap.

In FIG. 4, ship 10 is shown with the spill containment apparatus having progressed even further through the initial deployment process. The now floating boom 24 is shown encircling ship 10 in its fully expanded larger circumferential loop 25, and held away from ship 10 by the now stiffened boom support arms 26. FIG. 5 is a view illustrative of boom support arms 26 maintaining the floating boom 24 away from ship 10 to maintain ship 10 generally centered within the containment area of boom 24. Boom 24 is shown with the accordion folded, oil impervious curtain 28 attached on the underside thereof in a stored position, ready for downward vertical deployment.

Figure 6A:
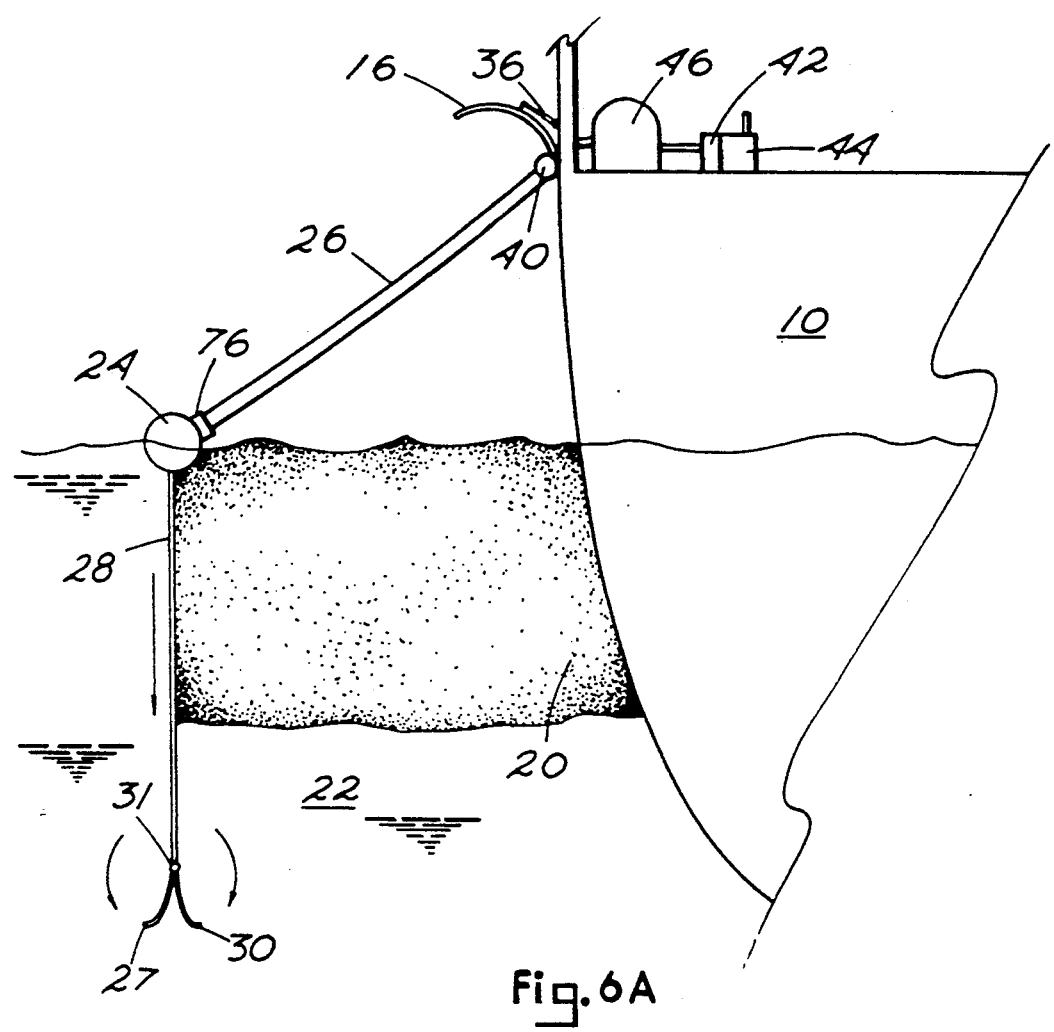
FIG. 6 A is generally representative of the FIG. 5 illustration, only with the oil impervious curtain having been deployed vertically downward in the water, and maintained downward by the weighted strap.
Figure 6B:
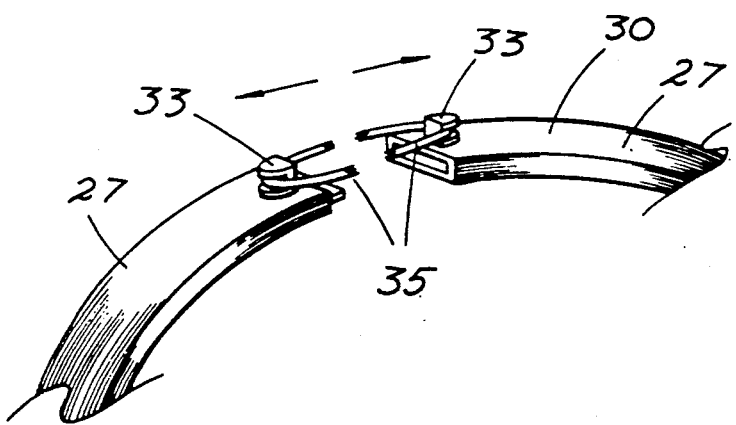
Figure 7:
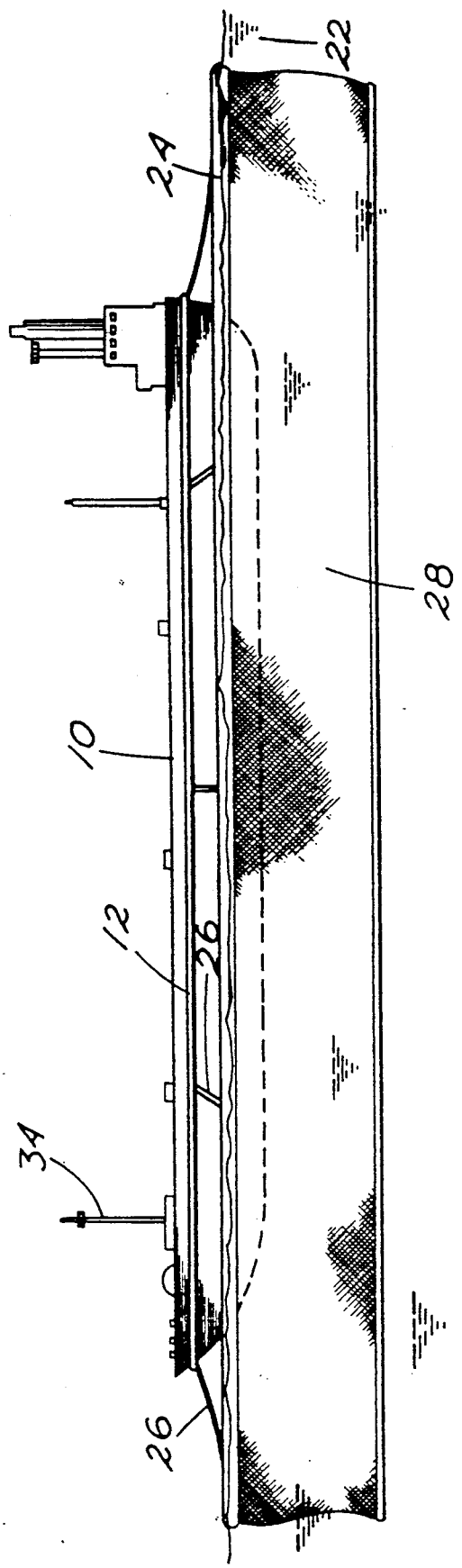
FIG. 7 is a side view of the ship illustrating the deployed floating boom, the oil impervious curtain hanging below the boom in the water, and the stiffened boom support arms affixed to both the ship and the boom.

FIG. 6 A is generally representative of the FIG. 5 illustration, only with the oil impervious curtain 28 having been unfolded and deployed vertically downward in the water, and maintained downward by a plurality of weighted straps 30. The floating oil spill at this point has been completely encircled and confined to a close proximity around ship 10, and if everything went smoothly, the entire process from the time the crew of ship 10 noticed the leak, to the time of complete containment, was less than one minute if the ship was dead in the water, or a few minutes longer if the ship had to take time to stop. It should be noted that boom 24 and curtain 28 may be dropped into the water if ship 10 is moving quite slowly.

Figure 8:
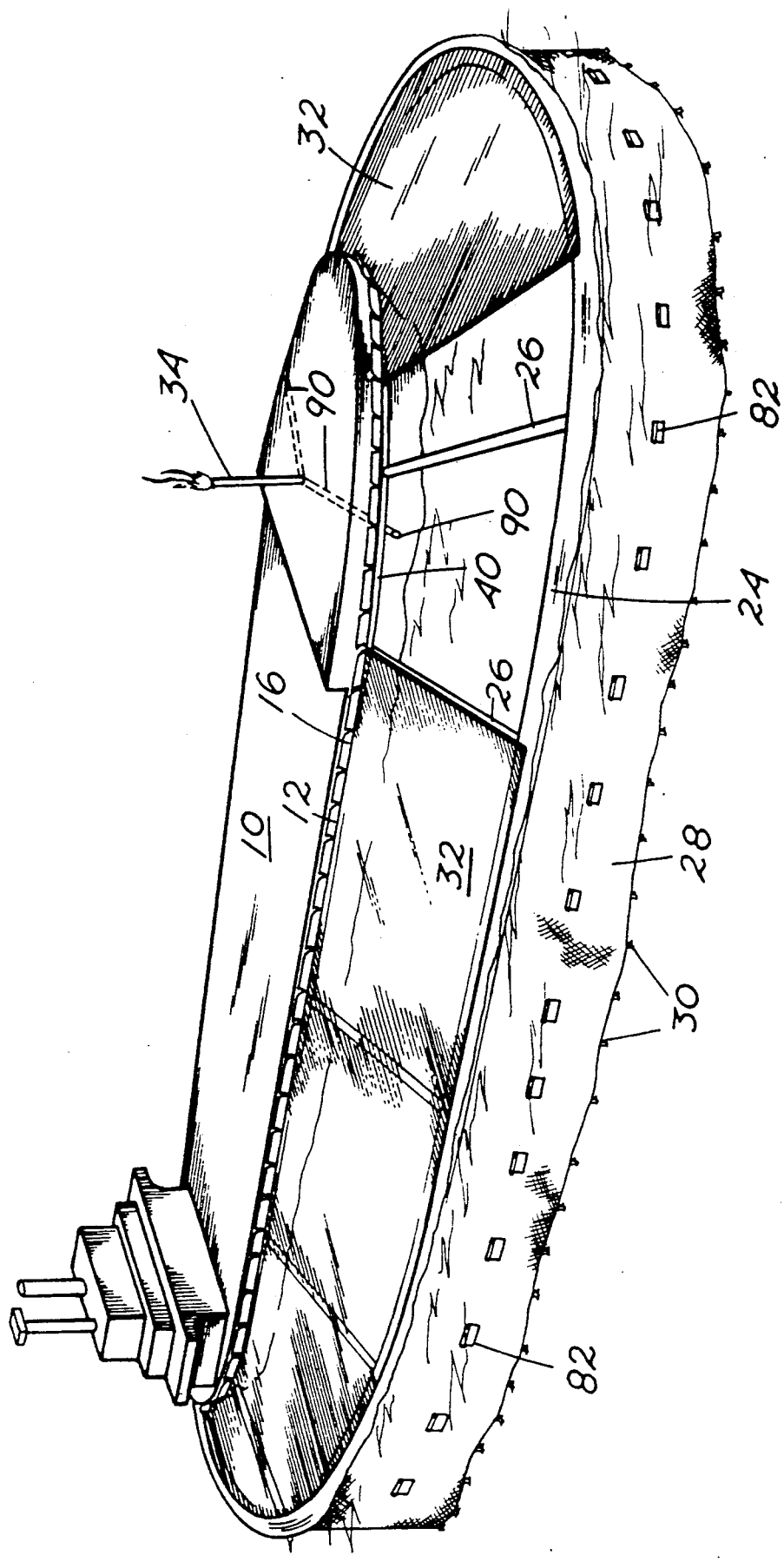
FIG. 8 is a view illustrating the deployed equipment described in FIG. 7 with the addition of a vapor curtain affixed at a bottom edge thereof to the floating boom, and anchored at an upper edge thereof to the ship hull to provide an opened bottom envelope over and around the spill. One area of the vapor curtain is shown removed to illustrate the positioning of the stiffened boom support arms under and supporting the vapor curtain. A fume burnoff stack is also shown in the center front of the ship.

FIG. 8 is a view illustrating the deployed equipment described in FIG. 6 A with the addition of accessory vapor containment curtain 32 affixed at a bottom edge thereof to boom 24, and affixed at an upper edge thereof to ship 10 to provide in combination with boom 24 and curtain 28, an opened bottom envelope over and around the spilt oil. A fume vent and burn-off stack 34 is also shown in the front top center of ship 10 to safely burn-off or vent any hazardous fumes captured under vapor curtain 32.

More detailed specifics will now be given on the preferred individual components, installation and operational processes of the invention.

Openable storage housing 12, which is attached to and encircles the entire structure 15 above the water line, is comprised primarily of a plurality of separate curved panels designated doors 16. Doors 16 are each hinged at the top or upper side thereof with a corrosion resistant hinge or hinges 18 to structure 15. Storage housing 12 may either have a back panel 19 as is used in FIG. 18 and 21 on derrick 14, or use the side of structure 15 as the back panel 19, which is usually possible with a ship. It is anticipated that storage housing 12 may be recessed inward and generally flush in its attachment to structure 15, rather than attached directly to the exterior of structure 15 and extending outward as shown in the drawings. Doors 16 should be opaque to block the entrance of ultraviolet light which would shorten the life of some of the components stored in housing 12. A transparent plastic door 16 would be suitable providing the plastic was treated much the same as quality sun glasses to block the passage of ultraviolet light. Doors 16 should be made of either a rigid, corrosion resistant metal, or a tough, rigid plastic which has been stabilized against breaking down in the sun by way of ultraviolet stabilizing additives added at the factory during the manufacture of the plastic. As shown in the drawings, the curve of each door 16 with the door closed or downward, is that the door 16 curves outward from hinging 18 at the top edge thereof, extending downward and then curving back inward to abut structure 15 or back panel 19 whichever is the used arrangement. Flexible gaskets and seals should be applied to all holes and cracks where necessary to generally seal the interior of housing 12 when in a closed state against the entrance of water. Flexible gaskets are recommended at locations such as at the side edge abutment of each door 16 adjacent another door 16, between the bottom of each door 16 and the structure 15 or panel 19, over hinges 18, and around conductor and hose entrances for example. If leaking occurs despite reasonable sealing attempts, weep-holes may be used at the bottom of each door 16 as a less desirable alternative to sealing. The space formed between the doors 16 and the side of structure 15 or panel 19 allows for storage of equipment therein. An opaque and properly sealed housing 12 will add years of useful life to boom 24, curtains 28 and 32, and boom support arms 26 stored therein.

Figure 18:
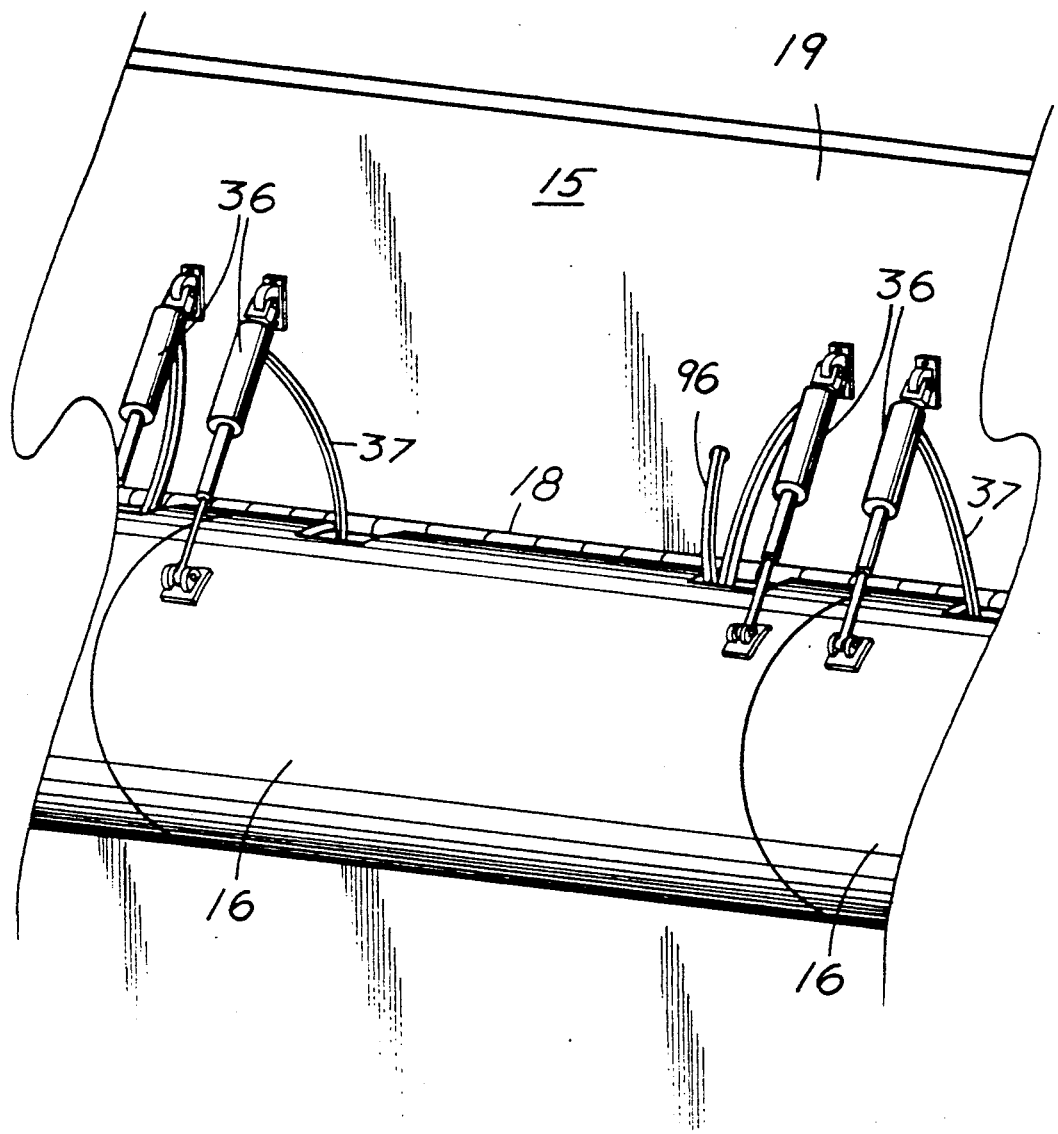
FIG. 18 is illustrative of one of the openable doors of the storage housing showing two linear extendable power arms as the actuators for opening the housing.

Each door 16 is retained downward to close housing 12 by at least one linear extendable actuator 36 affixed to each door 16 with actuator 36 in the extended position. Actuators 36 are used to pull doors 16 upward by retracting movement in actuators 36 to open housing 12. As shown in FIG. 18, two actuators 36 are preferably used per door 16. One end of each actuator 36 is pivotally attached to door 16, and the oppositely disposed end of each actuator 36 is pivotally attached to structure 15 or back panel 19 above door 16. Two actuators 36 per door 16 are preferred to assure that each and every door 16 opens when necessary. Through the use of two actuators 36 per door 16, if one actuator 36 fails in the retracting or door 16 opening mode for whatever reason, the other actuator 36 will open the door 16 by forcefully retracting the stuck actuator 36. In the very unlikely event both actuators 36 fail simultaneously on a single door 16, the weight of boom 24 and curtain 28 falling from housing 12 on either side of the stuck door 16 will force the stuck door 16 open sufficiently to allow that portion of boom 24 and curtain 28 behind the stuck door 16 to pull free and fall into the water. Actuators 36 may be electrically, hydraulically, or pneumatically powered.

In the preferred embodiment of the invention, actuators 36 are pneumatically powered. Each actuator 36 is of a type which is internally spring biased and maintained normally extended by the spring biasing to maintain doors 16 downward to close housing 12. Each actuator 36 is connected by a set of hoses 37 into a solenoid actuated air control valve 38, one valve 38 per actuator 36. Each air valve 38 is in turn connected and piped to receive pressured air from a pressurized manifold 40.

Manifold 40 is a large capacity, tubular air-pressure tank mounted to structure 15 or back panel 19 within housing 12 adjacent hinging 18 and the top of doors 16. Manifold 40 encircles structure 15 providing a convenient attachment location for air valves 38 and the pipe nipples which feed air between manifold 40 and each valve 38. Manifold 40 is pressurized by an air compressor 42 which is preferably driven by a diesel powered engine 44 positioned on the deck of structure 15 or any other suitable location. Diesel engine 44 should be equipped with pressure sensors which automatically start engine 44 if air pressure in manifold 40 becomes too low for whatever reason. Although manifold 40 has storage capacity for a large volume of compressed air under high pressure, it is desirable to maintain more than enough compressed air to compensate for any air leaks at any critical period, and to allow for rapid inflation of boom 24, and therefore, air is first pumped into a large volume reserve pressure tank 46 also located on the deck of structure 15 before the air enters manifold 40. The two air tanks, manifold 40 and reserve pressure tank 46 carry sufficient volumes of air at sufficient pressure to rapidly inflate boom 24 when necessary, with the tanks having a sizable amount of compressed air left therein after inflating boom 24 to hopefully keep up with any leaks in boom 24. Air compressor 42 powered by engine 44 will be pumping air into the system after the pressure drop which will result with the deployment of boom 24.

Although not shown in the drawings, it is desirable to have a back-up air compressor also connected by piping to pressure tank 46 or manifold 40 just in case for whatever reason, diesel engine 44 or air compressor 42 were to fail, or to be unable to keep up with any air leaks in the deployed system. The back-up air compressor could be electrically powered from the electrical system of structure 15.

Manifold 40 and pressure tank 46 are always pressurized once the system has been initially installed on structure 15. Auxiliary mechanical door latches and locks may be attached to doors 16 to allow the locking shut of doors 16 for maintenance and inspection of the system whenever necessary.

Figure 20:
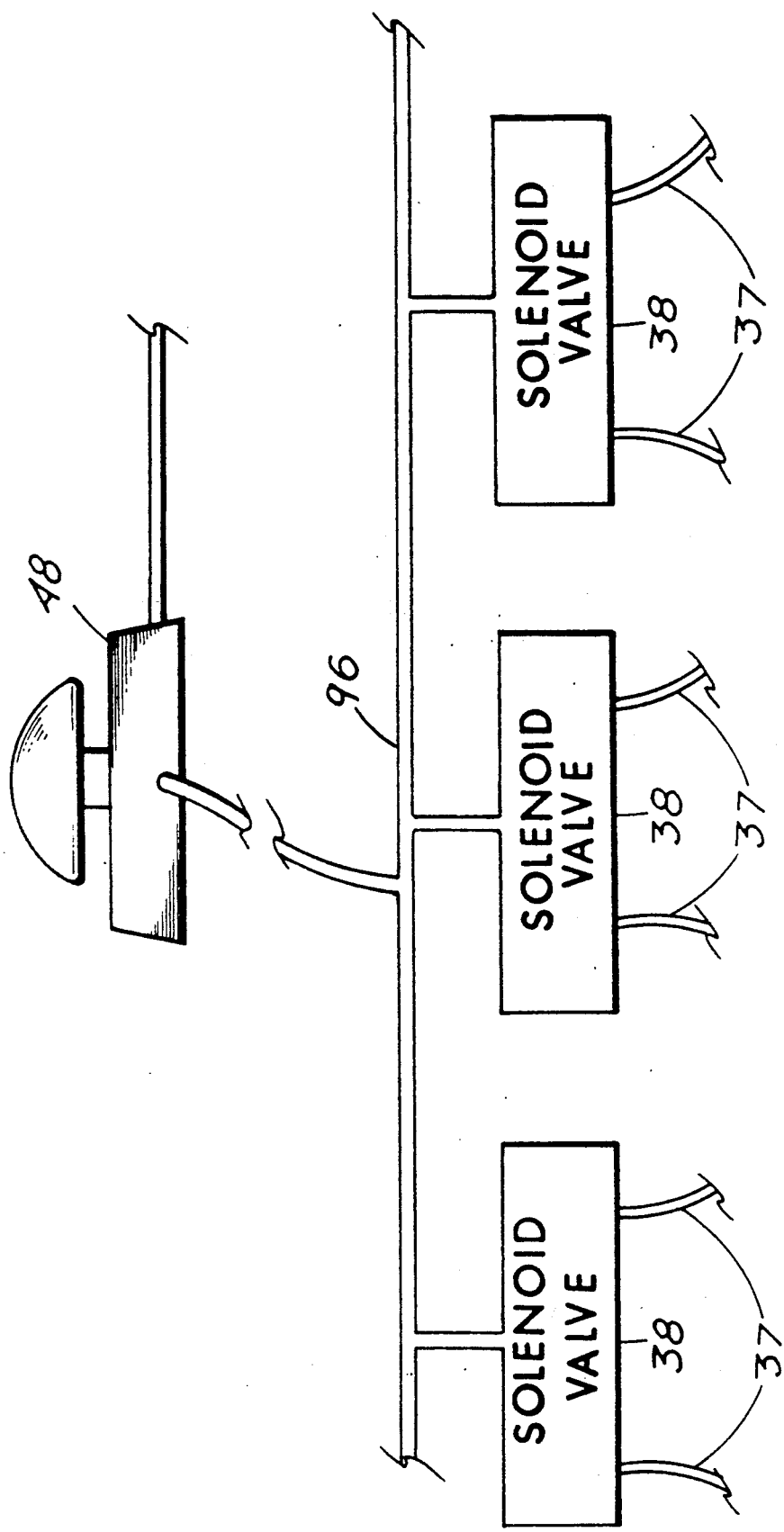
FIG. 20 diagrammatically illustrates some of the control components for activating the deployment operation in the event of a spill.

Referring now primarily to FIG. 20. In order to provide control of actuators 36 by a single person, the electrical power lines which feed power to solenoid air valves 38 are switched through a manually operable electrical switching device, such as a mushroom head push type switch 48 for example, see FIG. 20. An electromagnetic circuit contactor of course may be used in the circuit to handle the volume of in-rush current if necessary. Switch 48 would normally be located on the control bridge of structure 15, however multiple switches 48 wired in parallel in the control circuit could be scattered at various strategic locations around structure 15. Solenoid air control valves 38 are electrically deactivated with actuators 36 in the extended position maintaining doors 16 downward, or housing 12 closed. Solenoid air valves 38 are all connected in parallel to control circuit 96. When switch 48 is pressed, the circuit is closed, and power is circuited into all solenoid air valves 38 which are thus activated. Upon activation, valves 38 repositions internal gates to apply air pressure from manifold 40 into one end of each actuator 36. This causes all actuators 36 to simultaneously retract and open all doors 16 to allow equipment stored in housing 12 to fall downward. It should be noted I anticipate my system could be arranged to be fully automated using any number of available leak and fume sensor means placed near or in the water around structure 15. The sensor means could be used to trigger the fully automatic deployment of containment equipment, or to just trigger an alarm. Since it will cost quite a little money each time my containment apparatus is deployed into the water due to the cost of recovery and replacement of some of the components thereof, and there is always a chance of a fully automated control and deployment system being falsely or prematurely triggered, I prefer a deployment control system which is ultimately manually controlled.

Referring now mainly to drawing FIGS. 9, 10, 15, 16, 17, and 19 where boom 24 is shown in several conditions Boom 24, or at least the outer skin thereof, is constructed as a elongated tube manufactured of a fabric-backed or otherwise reinforced flexible plastic material such as polyethylene or polypropylene for example. The flexible material used to construct boom 24 is impervious to the passage of oil therethrough, and is desirably fire retardant and resistant to deterioration by ultraviolet light and petroleum based products. The flexible material is further desirably sufficiently buoyant to float on water with boom 24 in a completely deflated form, enabling a completely deflated section of boom 24 to still remain somewhat effective as a boom by floating on the surface of the water and partially supported by the hopefully still inflated sections of boom 24 on either side of the deflated section.

For the initial installation process of boom 24 into storage housing 12 attached to a structure 15, boom 24 may be formed in several separate lengths or pieces for ease of shipping and handling. The separate lengths may then be positioned end to end around the base of a ship in dry dock, or on the platform of an off-shore derrick 14. Once in place, the lengths would then be affixed together using heat seaming, sewing, bonding with adhesives and suitable combinations thereof or with other suitable means to affix the boom lengths into one continuous open centered ring or loop. The continuous loop of boom 24 contains no areas which are significantly smaller in diameter, or any joints or gaps which would allow the passage of oil therethrough when the boom was deployed in water. More information on the actual recommended installation of boom 24 up into housing 12 will be given later.

Figure 9:
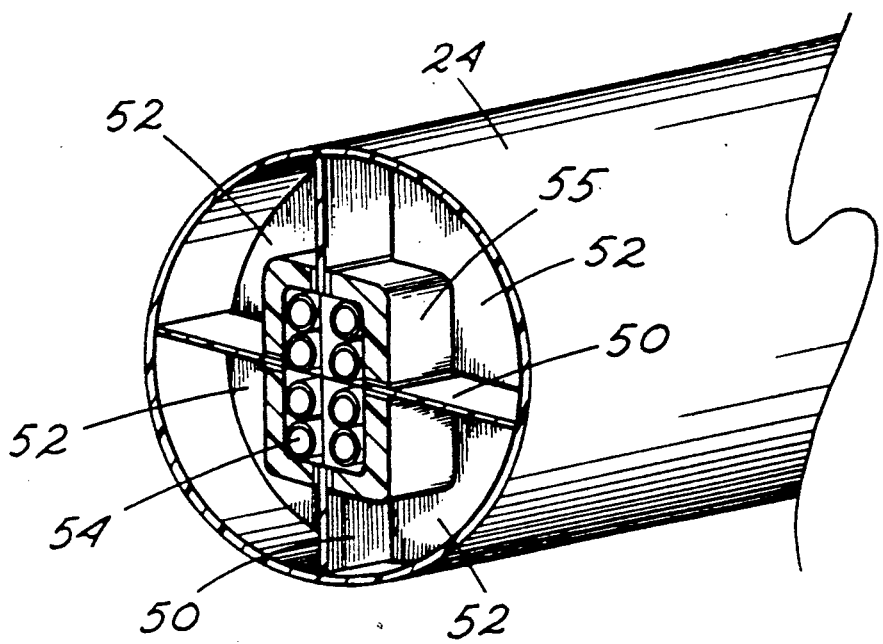
FIG. 9 is a perspective cross-sectional view of the preferred multi-chambered boom structure used as part of the invention. A bulkhead is shown dividing each chamber into elongated sections. Also shown are eight air flow restrictor valves passing through the bulkhead.
Figure 10:
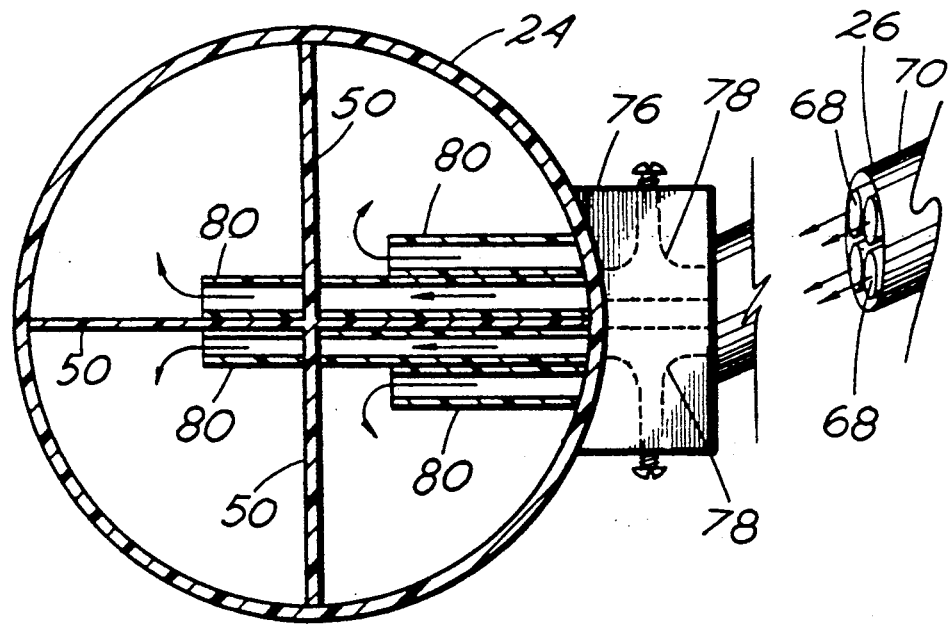
FIG. 10 is a cross-sectional view of the multichambered boom sectioned in another location from that of FIG. 9. Also shown is the end of one boom support arm adjacent the boom, a valve housing containing pressure regulating check valves affixed to the exterior of the boom, and individual tubing within the boom to feed air to each chamber thereof from the pressure regulating check valves.
Figure 17:
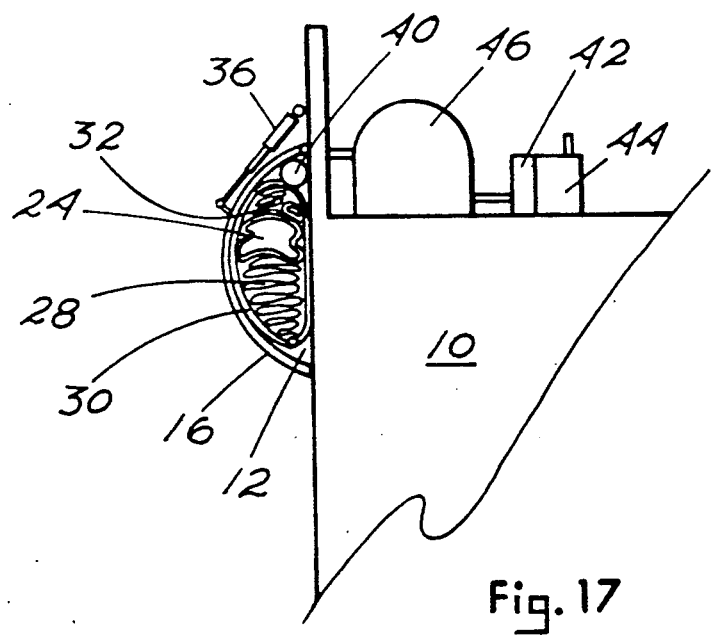
FIG. 17 is a sectioned view illustrative of the positioning of the boom and folded oil impervious curtain within the closed storage housing.
Figure 19:
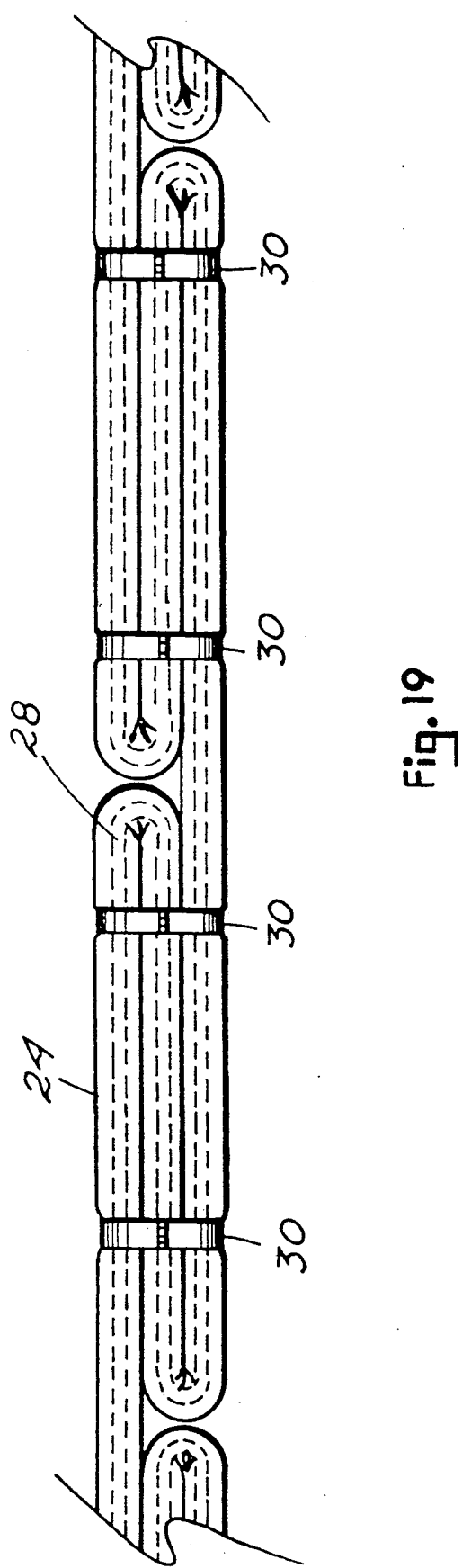
FIG. 19 is illustrative of the deflated boom and oil impervious curtain folded using accordion-like folds for storage thereof around the smaller circumference of a ship or derrick, with the accordion-like folds allowing the deployed boom and curtain to expand to a much greater second circumference when deployed in water to greatly increase the holding capacity of the containment barrier.

Boom 24 is inflatable and quite flexible to allow for collapsing in a deflated state into a small cross-sectional diameter for storage in the relatively small storage space within storage housing 12, and expandable by inflation with air to a large cross-sectional diameter relative to the small deflated cross-sectional diameter for deployment in water. Boom 24 is also sufficiently flexible to be folded accordion-like or otherwise as shown in FIG. 19 to form the small circumferential loop 23. The larger circumferential loop 25 of boom 24 and curtain 28 adds to the containment capacity within the interior open center between ship 10 and boom 24 when deployed in water, while the smaller circumferential loop 23 of boom 24 and curtain 28 provides for storing items 24 and 28 within the relatively small confines of storage housing 12 where the accordion folded boom 24 and curtain 28 are generally equal in circumference to the circumference of ship 10 in the area of attachment of storage housing 12. The accordion-like folding of boom 24 for storage, and the inflation thereof for deployment, allows expansion and unfolding from the small circumferential loop 23 to the much larger circumferential loop 25 when boom 24 is being deployed to contain a spill. In FIG. 17, boom 24 is shown deflated to a small cross-sectional diameter for storage in housing 12. In FIG. 9 and 10, boom 24 is shown inflated with air to a larger cross-sectional diameter. It is preferred boom 24 be at least one meter or larger in diameter in its inflated state to help prevent waves and oil from splashing over the boom.

Boom 24 is preferably divided into four separate lengthwise quadrants by an internally positioned elongated cross-shaped member 50 extending around the full circumference within the continuous loop of boom 24. Cross-shaped member 50 is flexible, and may be made of the same material as the outer skin of boom 24. Periodically, every twenty meters for example, boom 24 is further divided cross-sectionally with a generally flexible bulkhead 52 positioned within boom 24 as shown in FIG. 9. Bulkhead 52 may also be made of the same material as the outer skin of boom 24. Bulkhead 52 divides boom 24 into a plurality of elongated sections, with each section being divided into four elongated quadrants by cross-shaped member 50. Any single inflated quadrant section is sized sufficiently to float that section of boom 24 by itself. The compartmentalizing or multi-chambering of boom 24 will enhance the possibility of boom 24 staying afloat high in the water when deployed regardless of a few air leaks here or there.

Also shown in FIG. 9, are two air flow metering or restrictor valves 54 per each section end of each quadrant with a total of eight flow restrictor valves 54 positioned and retained in place by the single shown bulkhead 52. Bulkhead 52 may have a small rigid housing 55 positioned centrally therethrough to support the eight valves 54. Flow restrictor valves 54 direct air flow from one boom section into the adjacent boom section. A boom section is defined as the boom length between two bulkheads 52. Each boom section is divided into four quadrants, a single quadrant between two bulkheads 52 is a quadrant section 53.

Figure 11:
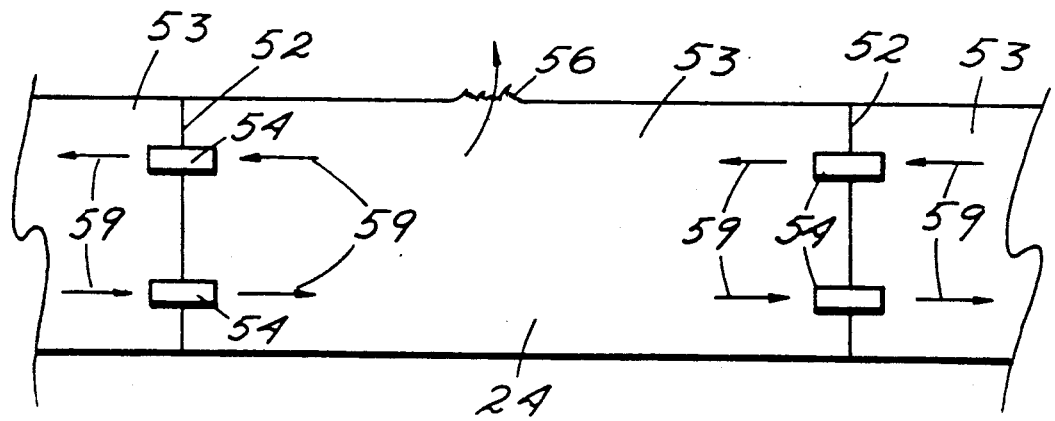
FIG. 11 is illustrative of one quadrant section of the boom, and a portion of the adjacent quadrant sections on each oppositely disposed end thereof. A rupture is shown spewing air from within the center quadrant section. Two air flow restrictors are shown placed in each bulkhead section at each end of the ruptured quadrant section.

Referring now mainly to FIG. 11, 12 A, and 12 B, for a brief explanation of flow restrictor valves 54. Flow restrictor valves 54 are positioned in bulkhead 52, two restrictor valves 54 at each end of each quadrant section 53. In FIG. 11, one full quadrant section 53 is illustrated with two restrictor valves 54 at each end thereof between the adjacent quadrant sections 53, which are only partially shown at each oppositely disposed end of the full quadrant section 53. The full quadrant section 53 is shown with a rupture 56 spewing air therefrom. Directional arrows 59 are used in the drawing to illustrate the air flow direction potential determined by a check valve 58 retained within each of the four identical restrictor valves 54. Air flow restrictor valves 54 are intended to prevent the pressuring system from continuing to try to fill or maintain full any single quadrant section of boom 24 which may have suffered a rather large rupture and is therefore incapable of being inflated. Each flow restrictor valve 54 is structured to allow only a certain predetermined volume of air to pass through the normally open valve 54 before the valve automatically closes, however, valves 54 preferably never close completely, thereby being able to ration small amounts of air into a quadrant section 53 which only has a small leak and keep it partially inflated. The allowed volume of air passed into a quadrant section 53 is sufficient to fill that quadrant section 53, plus at least one additional quadrant section 53 before the valve 54 is nearly closed. Check valves 58, built into each flow restrictor valve 54, allow one way flow of the air through the valves 54, however, as may be ascertained from FIG. 11, the two adjacent valve 54 in a quadrant section 53 are flip-flopped relative to each other, allowing any single boom quadrant section 53 to be filled with air coming from either adjacent section 53, and to allow supply air to the adjacent quadrant section 53, an arrangement which assures all or most boom quadrant sections 53 of being inflated even if one or more of the air supplying boom support arms 26 are inoperative for whatever reason. The center full quadrant section 53 in FIG. 11 is not a quadrant section which is directly supplied with air from a boom support arm 26, however, due to the positioning of the four flow restrictor valves 54 in the section 53, it may be supplied air indirectly from either one of the adjacent sections, with the adjacent quadrant section 53 possibly not being supplied air directly by one of the boom support arms 26 either.

Figure 12:
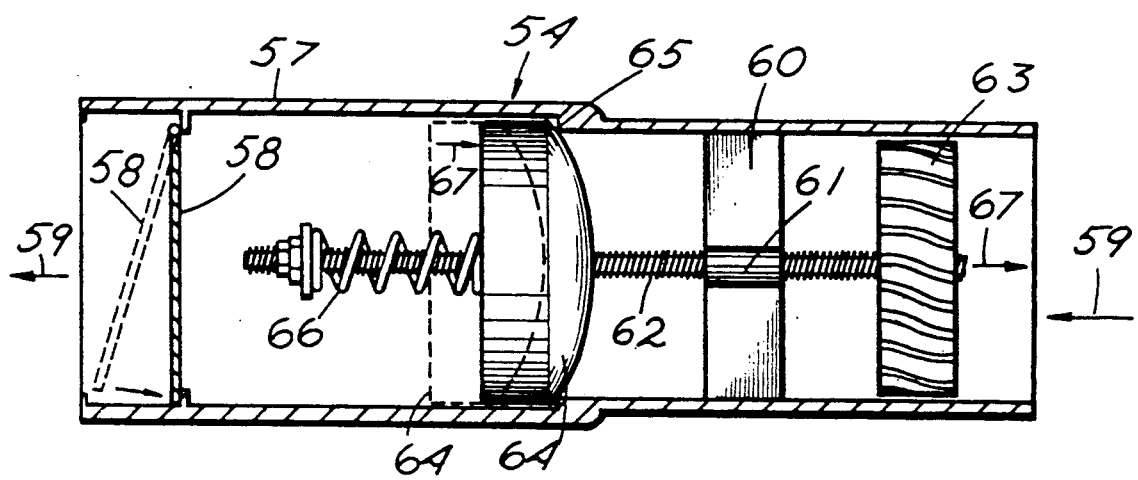
FIG. 12 A is a cross-sectional side view of one of the air flow restrictors shown in FIG. 11.
Figure 12:
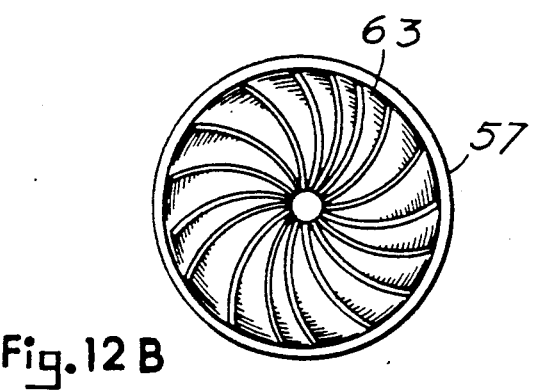

In FIG. 12 A, a partial cross section of a single air flow restrictor valve 54 is shown. Flow restrictor valve 54 is comprised of an open ended, rigid tubular housing 57 containing therein check valve 58 at one end thereof. Check valve 58 is shown open by dotted lines, and closed by sectioned lines. Directional arrow 59 indicates the possible air flow direction through the valve 54. Within and affixed to housing 57 is a stationary rigid support bracket 60 which has a central threaded bore 61. Threadably engaged through bore 61 is a rigid threaded rod 62. Attached stationary on one end of rod 62 is a wind impeller or turbine 63. FIG. 12 B shows an end view of housing 57 and impeller 63. Attached stationary on the opposite end of rod 62 is a circular disk, designated shut-off gate 64. The operation of air flow restrictor valve 54 is that as air is forced through housing 57, the air must first pass through impeller 63 causing impeller 63 to spin, thereby rod 62 and gate 64 are also rotated. As rod 62 rotates, rod 62 is lengthwise repositioned within housing 57 by way of the threads of rod 62 engaged with the threads in bore 61. Rod 62 is rotatably driven through bore 61. The direction of repositioning movement of rod 62, impeller 63 and gate 64 with air moving through the housing 57 is indicated with arrows 67. The repositioning of rod 62 reposition both the attached impeller 63, and more importantly shut-off gate 64. Gate 64 is pulled toward a narrowed area 65 of housing 57, and eventually abuts narrowed area 65 to either greatly reduce or completely stop the flow of air through flow restrictor valve 54, depending on the degree of sealing predetermined to be desirable or necessary at the factory between the two abutted structures 64 and 65. The amount of air allowed to pass through flow restrictor valve 54 is factory set by rotating gate 64 toward and away from one end of rod 62 and thus positioning gate 64 further or closer to narrowed area 65. A compression spring 66 abuts gate 64 and prohibits non-intended rotation of gate 64 on rod 62 once the position of gate 64 is set on rod 62. Air flow restrictor 54 is an example structure for the purpose, and other structures may be suitable replacements therefore.

Figure 15:
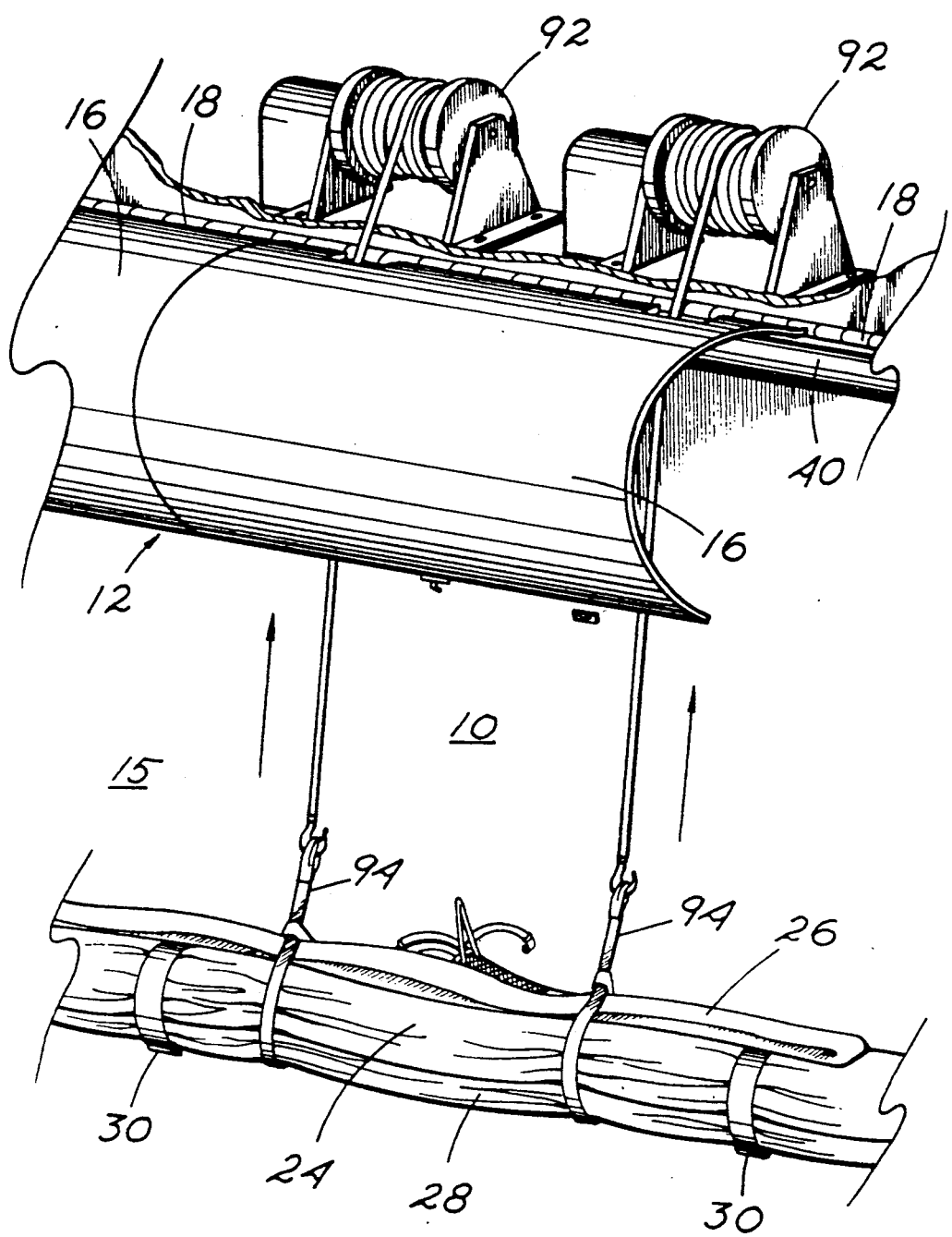
FIG. 15 illustrates a suggested storage and hoisting method of initially installing that portion of the spill containment apparatus which is deployable downward onto or toward the water from underneath the openable storage housing.
Figure 16:
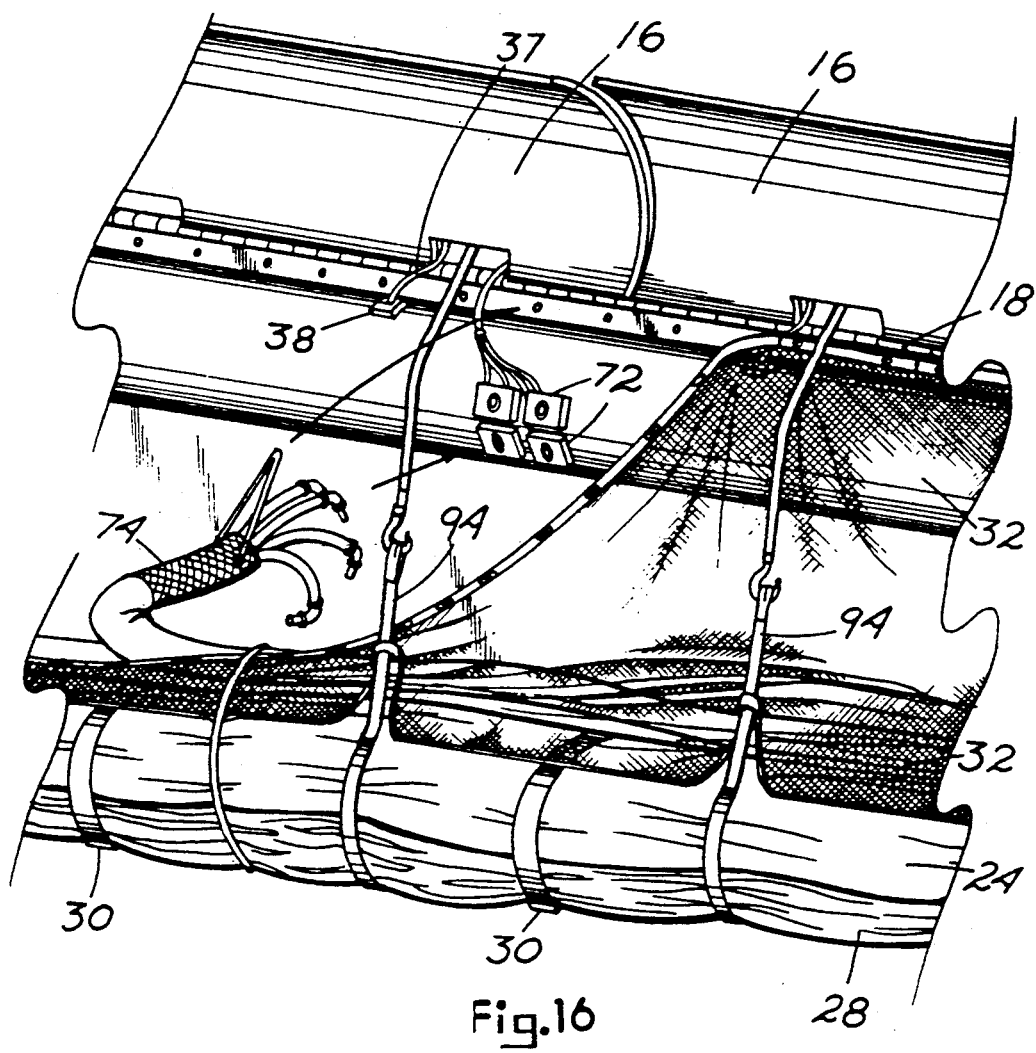
FIG. 16 further illustrates the initial installation of portions of the spill containment apparatus under the protective openable storage housing.

A detailed explanation of boom support arms 26 will now ensue with reference mainly to drawing FIG. 10, 15, and 16. Boom support arms 26 as stated earlier, become stiff with air pressure upon activation of the containment equipment shortly after a spill. The term "stiff" for the purpose of boom support arms 26, is generally defined as sufficiently rigid to maintain boom 24 positioned far enough from structure 15 to assure complete containment of the spill with structure 15 generally centered within the containment barrier, but still sufficiently flexible to move both vertically and horizontally somewhat with ocean tides and swells. As best seen in FIG. 10, each boom support arm 26 is preferably comprised of four separate flexible air carrying hoses or lines 68 within a non-air carrying flexible plastic outer jacket 70. One line 68 is used to feed air into a boom quadrant. Each line 68 is a plastic hose or line sufficiently flexible to collapse and fold when not inflated. As shown in FIG. 16, each line 68 is extended beyond the end of jacket 70 at one end thereof for attachment of lines 68 to individual solenoid actuated air control valves 72. Valves 72 are connected into manifold 40 to receive air much the same as air valves 38 of door actuator 36. Valves 72 are normally closed, not allowing the passage of air therethrough until electrically activated. Each valve 72 is also connected in parallel into power circuit 96 which controls valves 38, so that when switch 48 is depressed, circuit 96 is electrically activated, and all valves 38 activate actuators 36 to open all doors 16, while at the same time all valves 72 are electrically activated to allow the passage of air into lines 68 of boom support arms 26. Lines 68 connect one line 68 per one air valve 72. A strain insulator 74 is shown over jacket 70 which will be attached to structure 15 prior to completely storing the deployable equipment in housing 12 to structure 15 in order to reduce strain on the connection of lines 68 to valve 72 during downward deployment for containing an oil spill.

As shown in FIG. 10, the opposite ends of lines 68 of boom support arms 26 are attached to boom 24. At the connection of boom support arms 26 and lines 68 to boom 24 is a valve housing 76. Housing 76 contains four air pressure regulating valves 78, although only two are indicated in the drawing, the other two are behind the indicated valves 78. Each line 68 is connected to the input side of one valve 78, and the output side of each valve 78 feeds into one of the quadrants of boom 24 with short flexible plastic pipes 80 of the appropriate length to reach into the desired boom quadrant. A strain insulator is also desirable between boom 24 and each boom support arm 26 as is used at the upper ends of the support arms 26. One way check valves are desirably either built into each air pressure regulating valve 78 or placed directly adjacent thereto to prevent the escape of air from within boom 24 after inflation thereof, should for whatever reason the connected boom support arm 26 be severed. Manifold 40 contains air under relatively high pressure in order to store more air, and to positively actuate actuators 36. It is not necessary or desireable to apply the high air pressure into boom 24, and thus is the reason for air pressure regulating valves 78. Valves 78 reduce pressure into boom 24. Lines 68 of boom support arms 26 receive the relatively high pressure to feed air into boom 24, and to become stiff under the higher pressure. The multiple lines 68, solenoid valves 72, pressure regulating valves 78 and pipes 80, incorporated with multi-compartmentalizing of boom 24 is all intended to build redundancy into the containment structuring to prevent any catastrophic failure during an attempt to deploy the equipment to contain a spill.

Oil impervious curtain 28 is a downward extendable panel of flexible material attached to the bottom side of boom 24. Curtain 28, with boom 24 deployed in the water, and with curtain 28 extended vertically downward in the water, forms a circular barrier within the water below boom 24. Curtain 28 is attached to boom 24, extending around the entire circumference of boom 24, and serves to prohibit oil or other spilt material from passing under boom 24 and escaping the containment area. Curtain 28 may initially be in a plurality of panel sections much as described above in reference to the ease of shipping and handling of boom 24 for the initial placement of the curtain 28 adjacent structure 15 in preparation for the initial installation thereof into housing 12. In this multiple sectioned state, at some point before or after the end to end attachment of the sections of boom 24 into a continuous loop, the sections of curtain 28 would be attached to boom 24, and the edges of the sections of curtain would be seamed together using appropriate attachment means such as using heat seaming, sewing, bonding with adhesives and suitable combinations thereof or with other suitable means to affix the curtain sections into one continuous loop equal in circumference to that of boom 24 in its larger circumferential loop 25. Curtain 28 is desirably made of a material which is somewhat semipermeable to water in order to reduce the effects of currents in the water on the curtain 28, and is of a material which is impervious to the passage of oil and the like therethrough. The distance which curtain 28 hangs below boom 24 when deployed to contain spilt material will depend on the calculated volume of possible material to contain, or desired to be contained, and the circumference of boom 24 when deployed.

In order to pull and maintain curtain 28 vertically downward in the water, a plurality of weighted straps 30 are attached to the bottom edge of curtain 28, on the edge thereof oppositely disposed from boom 24. Straps 30 are placed at spaced interval around the entire circumference of curtain 28, and are sufficiently weighted, being preferably made of heavy brass, to hold curtain 28 vertically downward when deployed in the water under boom 24. Weighted straps 30 are specifically structured in order to also be useful as straps in maintaining a folded assemblage of boom 24 and curtain 28 retained together to allow the placement of the assemblage into housing 12 as a unit, an arrangement which will be explained in detail later. The weighted straps 30, are shown best in FIG. 3, 5, 6 A, and 6 B. Each strap 30 is structured of two curved plates 27 affixed together at one end with a hinge 31 as shown in FIG. 5, and releasably attachable at the ends thereof opposite the hinge 31 attached ends with a break-away looped strap 35 attached over two hooked knobs 33 as shown in FIG. 6 B. Strap 35 is manufactured to have a specific tensile strength, and to break as shown in FIG. 6 B upon being stressed to a predetermined limit. In use, weighted straps 30 are affixed around boom 24 in its deflated state and curtain 28. When boom 24 is inflated to its larger diameter, sufficient force is applied to break the break-away looped strap 35. This breaking occurs in the water, allowing the two curved plates 27 of strap 30 to fall outward and downward by way of hinge 31 as shown in FIG. 6 A. When strap 30 falls outward and downward, it pulls curtain 28 downward, and the weight of straps 30 maintain curtain 28 vertically. More information on weighted straps 30 being used as straps to restrain curtain 28 adjacent boom 24 will be given later.

Figure 13:
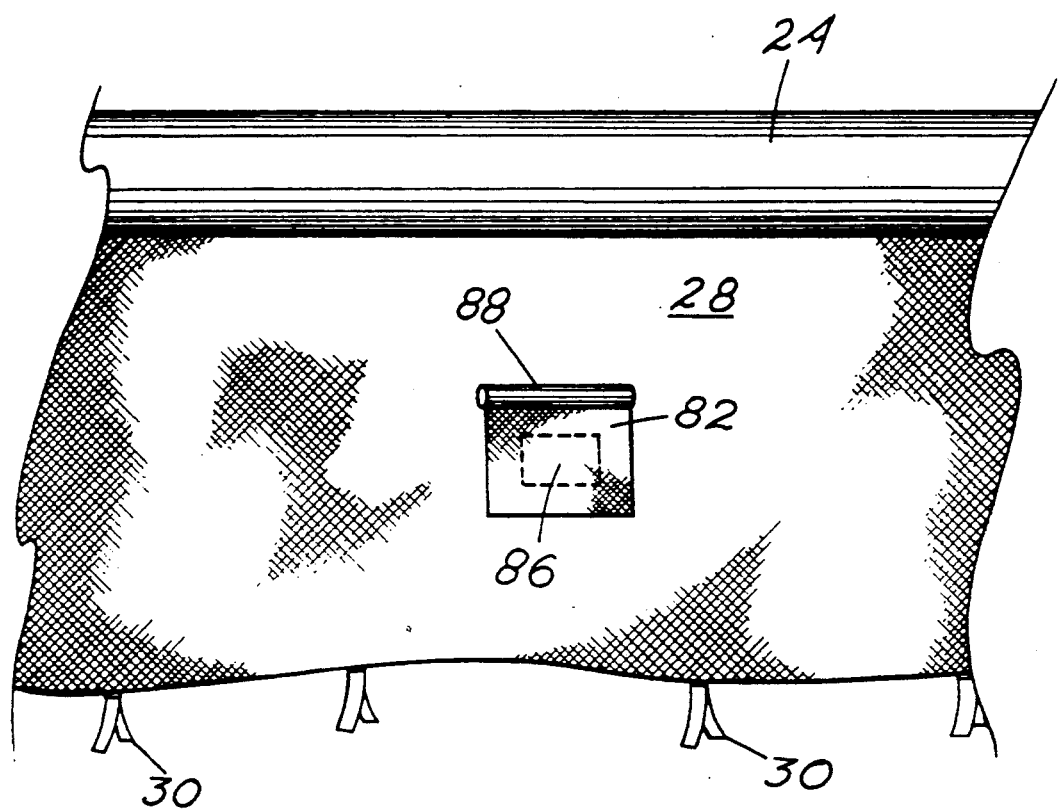
FIG. 13 shows a short section of boom with the oil impervious curtain hanging vertically. Shown in the center of the curtain is a pressure relieving check valve.
Figure 14:
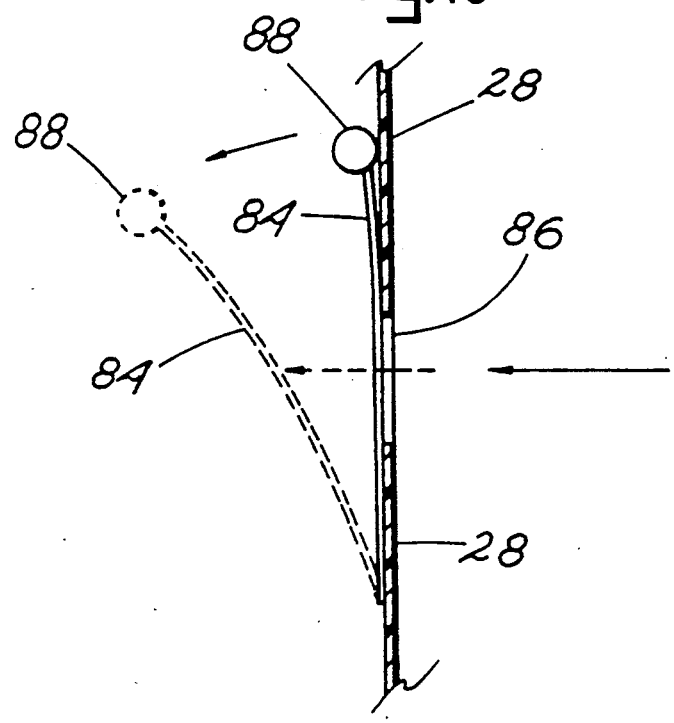
FIG. 14 is a sectional side view of the curtain and check valve of FIG. 13 with the check valve illustrated with dotted lines in the open position.

Curtain 28 may contain a plurality of check valves 82 as shown in FIG. 8, 13, and 14. Each check valve 82 is comprised of a flexible panel 84 sewn or otherwise attached over an aperture 86 in curtain 28. A floatation member 88 is attached to the upper edge of panel 84, designed to hold panel 84 generally vertical in the water, and the attachment of panel 84 to curtain 28 is made on the underside of aperture 86 so that when floatation member 88 is supporting panel 84 vertically oriented, panel 84 covers and closes aperture 86. Panel 84 and floatation member 88 are positioned on the inside of the oil containment area, toward structure 15, so that a burst of water pressure or a wave may force open check valve 82 as shown in FIG. 14 and eliminate some of the pressures the water pressures may have exerted onto curtain 28. Water flowing into the contained area through check valve 82 will displace water from below any contained floating material, downward and out of the contained area under the bottom of curtain 28. When check valve 82 is not being forced open by water pressure, floatation member 88 holds panel 84 over aperture 86 preventing the escape of the contained material through aperture 86. In FIG. 8, a plurality of check valves 82 are shown being used.

As an optional accessory for use with boom 24 and curtain 28 is vapor curtain 32 for capturing vapors arising from evaporating spilt materials. Vapor curtain 32 is primarily for use when oil or similar products are the likely materials to be contained, and are materials likely to give off hazardous fumes presenting a risk of explosion or fire. Vapor curtain 32 when deployed along with boom 24 and curtain 28, captures fumes, and the fumes are then routed to burn-off stack 34 for disposal. Vapor curtain 32 may be an upward extension and continuation of oil impervious curtain 28, but is preferably a completely separate curtain altogether since the two curtains serve different purposes which are best served using slightly different materials for the make up of curtains 28 and 32. Vapor curtain 32 is made of flexible material capable of being folded for storage, and may be delivered to structure 15 for the initial installation in panel sections much the same as boom 24 and curtain 28, and then assembled together using suitable attachment methods and materials such as heat seaming, sewing, bonding with adhesives and suitable combinations thereof. The material of vapor curtain 32 may be a fabric reinforced plastic or other suitable material, and must be generally impervious to the passage of fumes which arise from oil. The material must also be of a type which will not break-down quickly when exposed to petroleum based products or fumes, and is further desirably resistant to deterioration by ultraviolet light of the sun, and resistant to burning. Vapor curtain 32 is affixed at a bottom edge thereof to boom 24 around the entire circumference of boom 24, and affixed at an upper edge thereof to structure 15 to provide in combination with boom 24 and curtain 28, an opened bottom envelope over and around the spilt oil. Vapor curtain 32 is sized to allow attachment thereof to structure 15, and to allow expansion of boom 24 to its large circumference 25.

As shown in FIG. 16, the upper edge of vapor curtain 32 is attached to structure 15 within the upper boundaries of housing 12 to allow the entire curtain 32 to be stored in housing 12 along with boom 24 and curtain 28. Curtain 32 may be attached to structure 15 by bolting in combination with strips of metal or plastic placed over its upper edge. Silicone rubber or other suitable gasketing means should by applied at the connection of curtain 32 to structure 15 to form a generally gas tight seal. A generally gas tight sealing is also desirable at the connection of vapor curtain 32 to boom 24. Vapor curtain 32 is positioned in its attachments so that when deployed, curtain 32 rests on and is supported by the stiffened boom support arms 26 as shown in FIG. 8.

In FIG. 21, housing 12 is shown attached around derrick 14 leaving a gap between the top of housing 12 and the bottom of the platform of derrick 14. In this situation, if vapor curtain 32 is to be deployed, housing 12 may be moved upward, or the gap may be closed with metal paneling. Derricks vary widely in construction from one derrick to another, and I anticipate those skilled in the art will be able to make the relatively simple necessary adjustments depending on the derrick.

Burn-off stack 34 shown in FIG. 8 and 21, is to safely vent or burn-off any hazardous fumes captured under vapor curtain 32. The discharge end of the relatively tall stack 34 is sufficiently high above the ship to prevent causing an explosion or fire near the spill. Burn-off stack 34 is connected by conduits 90 positioned on or under the deck of structure 15 into the contained area below curtain 32. In the operation of vapor curtain 32, fumes will evaporate from the oil underneath the curtain and create a positive pressure thereunder. This positive pressure will naturally vent along with the gases up through conduits 90 and out the top of burnstack 34. In order to expedite the venting process, a fan may be installed adjacent boom 24 to input air from outside the contained area up underneath curtain 32. In any case, when vapor curtain 32 is used, all electrical equipment under or near the curtain 32, such as valve 32, 78, and wiring therefore, must be rated for use in that particular hazardous atmosphere.

Burn-off stack 34 is fitted with a gas ignition assembly which is lit upon deployment of boom 24 and vapor curtain 32. This ignition of the gas ignition device may be manually controlled or fully or semi-automatic. When semi-automatic, gas ignition device can be controlled from the controlled power circuit 96 which activates valves 38 and 72. When fully automatic, gas sniffers placed in strategic locations around structure 15 may be used to control an electromagnetic power control relay which will direct power to ignite the burner. Natural gas from a storage tank on structure 15 will be used to light and maintain burn-off stack 34 burning.

Referring now mainly to drawing FIG. 15, 16, 17, and 19 for a brief explanation of a suggested method of storing boom 24, curtains 28 and 32, and boom support arms 26 within housing 12. A deflated boom 24 is assembled encircling structure 15 in its large circumferential loop 25 with boom support arms 26 attached at boom 24. Boom support arms 26 are best left unattached at the upper ends thereof. Curtain 28 with attached weighted straps 30, and vapor curtain 32 if used, are assembled and attached to boom 24. Curtain 28 and 32 are first folded using accordion-like folds as shown in FIG. 17, with this first accordion-like folding bringing and placing the curtains 28 and 32 in close proximity to the top and bottom side of the deflated boom 24. Boom 24 is in its large circumferential loop 25 at this stage. Boom 24 with the folded curtain 28 and vapor curtain 32 if used, are then accordion folded as shown in FIG. 19 to reduce the circumference of the assemblage to the small circumferential loop 23 of boom 24. This second folding operation again accordion folds the already once accordion folded curtains 28 and 32.

Weighted straps 30 are specifically structured in order to be useful in maintaining this folded assemblage somewhat retained together to allow its placement into housing 12 as a unit. As shown in FIG. 16 and 19, after boom 24 and curtain 28 are properly folded, straps 30 are affixed around the assemblage and affixed together or closed. Straps 30 are not affixed around curtain 32 as shown in FIG. 16 in order to leave the upper edge of the curtain 32 free to allow attachment thereof to structure 15. As shown in FIG. 16, short areas of curtain 32 are left unattached to allow the slipping of straps 30 around boom 24 and curtain 28 and under the lower edge of curtain 32. Similar unattached short sections between curtain 32 and boom 24 are also left for other straps 94 used for hoisting which will be explained later. As shown in FIG. 15, winches 92 may be temporarily bolted to structure 15 above housing 12. Cables with hooks on the free ends thereof from winches 92 are dropped through small openings in each door 16 with the doors 16 in the open position. Flexible straps 94 are straps which have a loop at each oppositely disposed end thereof. Straps 94 are wrapped around the accordion-like folded boom 24, curtain 28, and the accordion-like folded boom support arms 26, but again, not around vapor curtain 32 if used. One loop of each strap 94 is passed through the opposite loop of the strap to form a slip noose around the folded structure. The free end of each strap 94 is then attached to the hook of the cable of winch 92. The folded structure may then be hoisted up underneath doors 16 where the free edge of vapor curtain 32 is attached to structure 15, and the free ends of boom support arms 26 are attached to valves 72. The folded assemblage is then hoisted further upward bring the hooks of the cables through the openings in doors 16. Doors 16 are then closed captively retaining the deployable structure. The hoisting cable hook may then be un-hooked from straps 94, and the looped free ends of straps 94 are pushed back through the opening in doors 16 and the openings are sealed. When boom 24 and boom support arms 26 are dropped for deployment from housing 12, strap 94 will separate, pulling the one looped end thereof through the other looped end of the strap to allow continued downward deployment and expansion of boom 24.

Although not shown in the drawings, my spill containment apparatus when in a deployed state will function to continue to contain a spill floating around a ship 10 which has either partially sunk, or completely sunk, providing the ship sank in about 70 meters of water or less. With ship 10 sunk or partially sunk, boom support arms 26 angle upward to allow boom 24 to float on top of the water where boom 24 and curtain 28 contain spilt material as usual.

Although I have very specifically described the preferred methods and structures of the invention, it should be understood that the specific details are just that, "preferred" methods and structures given for example to those skilled in the art. It should further be understood that the scope of the invention is not to be limited by the specification given for example, but is to be determined by the spirit of the scope of the appended claims.

What I claim as my invention is:

1. A spill containment apparatus attachable around a structure positioned in water such as a ship, said apparatus for confining spilt material in the water to close proximity to the structure, said apparatus comprising:

a continuous loop of inflatable boom generally made of flexible oil impervious material, said inflatable boom in a deflated and folded condition having a small circumferential diameter, said inflatable boom in an inflated and unfolded condition having a large circumferential diameter substantially larger than said small circumferential diameter;

a plurality of bulkheads placed in said inflatable boom at spaced intervals dividing said inflatable boom into a plurality of compartments;

valve means placed in said bulkheads, said valve means having means for constricting after passage of a predetermined amount of pressurized air so as to prevent continuous escape of large volumes of air from a ruptured compartment of said inflatable boom;

a continuous loop of flexible curtain affixed to said inflatable boom, said flexible curtain generally made of oil impervious material and sized to hang downward a distance below said inflatable boom when in the water for preventing the passage of spilt material under said inflatable boom, said flexible curtain extending circumferentially aligned around said inflatable boom, said flexible curtain being sufficiently flexible to be placed in close proximity to said inflatable boom for storage in a relatively small space, said flexible curtain including means for providing and maintaining downward extended generally vertical positioning of said flexible curtain when in the water;

a plurality of elongated flexible boom support arms each having at least one conduit means therein, a first end of each of said support arms affixed to said inflatable boom at spaced intervals, a first end of each of said at least one conduit means being in communication with at least one of said compartments of said inflatable boom, a second end of each of said support arms anchored by the structure at spaced intervals around the structure, a second end of each of said at least one conduit means connected to a pressurized air source so as to be able to conduct pressurized air from said pressurized air source into said inflatable boom, said support arms having means for stiffening with said pressurized air for providing support to said inflatable boom outward away from the structure when said inflatable boom is deployed in the water;

a protective storage housing affixed to and around an exterior circumference of the structure, said protective storage housing sized for containing said inflatable boom in said deflated and folded condition with said attached flexible curtain in close proximity thereto, said protective storage housing further sized for containing therein said support arms;

single person actuation means for deploying said inflatable boom and said attached flexible curtain from within said protective storage housing into the water, said means for deploying including means for actuating the inflation of said inflatable boom and actuating said means for providing and maintaining downward extended generally vertical positioning of said flexible curtain, said means for deploying further including means for actuating said means for stiffening said support arms.

2. A spill containment apparatus attachable around a structure positioned in water such as a ship, said apparatus for confining spilt material in the water and vapors rising off the spilt material to close proximity to the structure, said apparatus comprising;

a continuous loop of inflatable boom made of flexible generally oil impervious material, said inflatable boom in a deflated and folded condition having a small circumferential diameter, said inflatable boom in an inflated and unfolded condition having a large circumferential diameter substantially larger than said small circumferential diameter;

a continuous loop of flexible curtain affixed to said inflatable boom, said flexible curtain generally made of oil impervious material and sized to hang downward a distance below said inflatable boom when in the water for preventing the passage of spilt material under said inflatable boom, said flexible curtain extending circumferentially aligned around said inflatable boom, said flexible curtain being sufficiently flexible to be placed in close proximity to said inflatable boom for storage in a relatively small space, said flexible curtain including means for providing and maintaining downward extended generally vertical positioning of said flexible curtain when in the water;

a flexible vapor containment curtain made of generally vapor impervious material, a bottom edge of said vapor containment curtain attached by generally vapor tight sealing means to said inflatable boom and extending circumferentially aligned around said inflatable boom, an upper edge of said vapor containment curtain attached by generally vapor tight sealing means to the structure and extending around an exterior circumference of the structure, said vapor containment curtain being sufficiently flexible to be placed in close proximity to said inflatable boom for storage in a relatively small space;

a plurality of elongated flexible boom support arms each having at least one conduit means therein, a first end of each of said support arms affixed to said inflatable boom at spaced intervals, a first end of each of said at least one conduit means being in communication with said inflatable boom, a second end of each of said support arms anchored by the structure at spaced intervals around the structure, a second end of each of said at least one conduit means connected to a pressurized air source so as to be able to conduct pressurized air from said pressurized air source into said inflatable boom, said support arms having means for stiffening with said pressurized air for providing support to said inflatable boom outward away from the structure when said inflatable boom is deployed in the water, said support arms when stiffened and providing support to said inflatable boom outward away from the structure being positioned to at least assist in supporting said vapor containment curtain above the water;

a protective storage housing affixed to and around an exterior circumference of the structure, said protective storage housing sized for containing said inflatable boom in said deflated and folded condition with said attached flexible curtain and said vapor containment curtain both in close proximity to said inflatable boom, said protective storage housing further sized for containing therein said support arms;

single person actuation means for deploying said inflatable boom with said attached flexible curtain from within said protective storage housing into the water, said inflatable boom when deployed in the water pulling said bottom edge of said vapor containment curtain downward with said upper edge of said vapor containment curtain remaining attached to the structure, said means for deploying including means for actuating inflation of said inflatable boom and actuating said means for providing and maintaining downward extended generally vertical positioning of said flexible curtain, said means for deploying further including means for actuating said means for stiffening said support arms, said spill containment apparatus when deployed outward and around the structure in the water adapted to provide an opened bottom envelope over and around spilt material to control floating spilt material and vapors rising from the floating spilt material.

3. A spill containment apparatus attachable around a structure positioned in water such as a ship, said apparatus for confining spilt material in the water and vapors rising off the spilt material to close proximity to the structure, said apparatus comprising;

a continuous loop of inflatable boom made of flexible generally oil impervious material, said inflatable boom in a deflated and folded condition having a small circumferential diameter, said inflatable boom in an inflated and unfolded condition having a large circumferential diameter substantially larger than said small circumferential diameter;

a plurality of bulkheads placed at spaced intervals in said inflatable boom dividing said inflatable boom into a plurality of compartments;

valve means placed in said bulkheads, said valve means having means for constricting after passage of a predetermined amount of pressurized air so as to prevent continuous escape of large volumes of air from a ruptured compartment of said inflatable boom;

a continuous loop of flexible curtain affixed to said inflatable boom, said flexible curtain generally made of oil impervious material and sized to hang downward a distance below said inflatable boom when in the water for preventing the passage of spilt material under said inflatable boom, said flexible curtain extending circumferentially aligned around said inflatable boom, said flexible curtain being sufficiently flexible to be placed in close proximity to said inflatable boom for storage in a relatively small space, said flexible curtain including means for providing and maintaining downward extended generally vertical positioning of said flexible curtain when in the water;

a flexible vapor containment curtain made of generally vapor impervious material, a bottom edge of said vapor containment curtain attached by generally vapor tight sealing means to said inflatable boom and extending circumferentially aligned around said inflatable boom, an upper edge of said vapor containment curtain attached by generally vapor tight sealing means to the structure and extending around an exterior circumference of the structure, said vapor containment curtain being sufficiently flexible to be placed in close proximity to said inflatable boom for storage in a relatively small space;

a plurality of elongated flexible boom support arms each having a plurality of individual hoses therein, a first end of each of said support arms affixed to said inflatable boom at spaced intervals, a first end of each of said individual hoses being in communication with at least one of said compartments of said inflatable boom, a second end of each of said support arms anchored by the structure at spaced intervals around the structure, a second end of each of said individual hoses connected to a pressurized air source so as to be able to conduct pressurized air from said pressurized air source into said inflatable boom, said support arms having means for stiffening with said pressurized air for providing support to said inflatable boom outward away from the structure when said inflatable boom is deployed in the water, said support arms when providing support to said inflatable boom outward away from the structure being positioned to at least assist in supporting said vapor containment curtain above the water;

a protective storage housing affixed to and around an exterior circumference of the structure, said protective storage housing sized for containing said inflatable boom in said deflated and folded condition with said attached flexible curtain and said vapor containment curtain both in close proximity to said inflatable boom, said protective storage housing further sized for containing therein said support arms;

single person actuation means for deploying said inflatable boom with said attached flexible curtain from within said protective storage housing into the water, said inflatable boom when deployed in the water pulling said bottom edge of said vapor containment curtain downward with said upper edge of said vapor containment curtain remaining attached to the structure, said means for deploying including means for actuating inflation of said inflatable boom and actuating said means for providing and maintaining downward extended vertical positioning of said flexible curtain, said means for deploying further including means for actuating said means for stiffening said support arms, said spill containment apparatus when deployed outward and around the structure in the water adapted to provide an opened bottom envelope over and around spilt material to control floating spilt material and vapors rising from the floating spilt material.

4. An apparatus according to claim 3 further including conduit means positioned to direct vapors contained under said vapor containment curtain into an elongated stack for disposal.

5. An apparatus according to claim 4 further including said elongated stack equipped with an ignition assembly for disposing of said vapors by burning.

* * * * *